(12) United States Patent
Amma et al.

(10) Patent No.: US 9,764,554 B2
(45) Date of Patent: Sep. 19, 2017

(54) METHOD FOR MANUFACTURING MOLDED MEMBER AND LIQUID EJECTING HEAD, LIQUID EJECTING HEAD, AND MOLD

(71) Applicant: CANON KABUSHIKI KAISHA, Tokyo (JP)

(72) Inventors: Hiromasa Amma, Kawasaki (JP); Yukuo Yamaguchi, Tokyo (JP); Mikiya Umeyama, Tokyo (JP); Satoshi Oikawa, Yokohama (JP); Takuya Iwano, Inagi (JP); Satoshi Kimura, Kawasaki (JP); Naoko Tsujiuchi, Kawasaki (JP); Yasushi Iijima, Tokyo (JP); Kyosuke Toda, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/156,583

(22) Filed: May 17, 2016

(65) Prior Publication Data
US 2016/0347066 A1   Dec. 1, 2016

(30) Foreign Application Priority Data

May 25, 2015 (JP) ................................. 2015-105160
Apr. 21, 2016 (JP) ................................. 2016-085625

(51) Int. Cl.
*B41J 2/16* (2006.01)
*B29C 45/26* (2006.01)
(Continued)

(52) U.S. Cl.
CPC ......... *B41J 2/1637* (2013.01); *B29C 45/0025* (2013.01); *B29C 45/2628* (2013.01);
(Continued)

(58) Field of Classification Search
CPC ....................... B41J 2/17559; B29C 45/2628
See application file for complete search history.

(56) References Cited

U.S. PATENT DOCUMENTS 6,260,961 B1 * 7/2001 Seu ...................... B41J 2/17503
347/87
6,805,437 B2  10/2004 Yamanaka et al.
(Continued)

FOREIGN PATENT DOCUMENTS

JP         3801003 B2     7/2006

OTHER PUBLICATIONS

Oikawa et al., U.S. Appl. No. 15/157,890, filed May 18, 2016.
(Continued)

*Primary Examiner* — Shelby Fidler
(74) *Attorney, Agent, or Firm* — Fitzpatrick, Cella, Harper & Scinto

(57) ABSTRACT

There is provided a method for manufacturing a molded member having a hollow part. The method comprises a step for molding the hollow part by extracting a first piece, a second piece, a third piece and a fourth piece of a mold in four different directions. The second piece has an elongated shape in its extracting direction, the second piece and the fourth piece have extracting directions substantially opposed to each other, and at the molding, each of the first piece, the second piece, the third piece and the fourth piece abuts on at least one of the first piece, the second piece, the third piece and the fourth piece.

10 Claims, 25 Drawing Sheets

(51) Int. Cl.
*B29C 45/33* (2006.01)
*B29C 45/00* (2006.01)
B29L 31/00 (2006.01)

(52) U.S. Cl.
CPC .............. *B29C 45/33* (2013.01); *B41J 2/162* (2013.01); *B29C 2045/0036* (2013.01); *B29L 2031/767* (2013.01)

(56) References Cited

U.S. PATENT DOCUMENTS

| | | | | |
|---|---|---|---|---|
| 2004/0095447 | A1* | 5/2004 | Bailey | B41J 2/17553 347/87 |
| 2005/0174401 | A1* | 8/2005 | Jung | B41J 2/17513 347/86 |
| 2007/0205535 | A1* | 9/2007 | Vitulli | A43B 1/0036 264/250 |
| 2008/0018033 | A1* | 1/2008 | Hiroki | B29C 45/33 267/182 |

OTHER PUBLICATIONS

Oikawa et al., U.S. Appl. No. 15/151,880, filed May 11, 2016.
Iwano et al., U.S. Appl. No. 15/156,649, filed May 17, 2016.
Tsujiuchi et al., U.S. Appl. No. 15/157,909, filed May 18, 2016.
Iwano et al., U.S. Appl. No. 15/156,578, filed May 17, 2016.
Toda et al., U.S. Appl. No. 15/156,559, filed May 17, 2016.
Kimura et al., U.S. Appl. No. 15/156,569, filed May, 17, 2016.

* cited by examiner

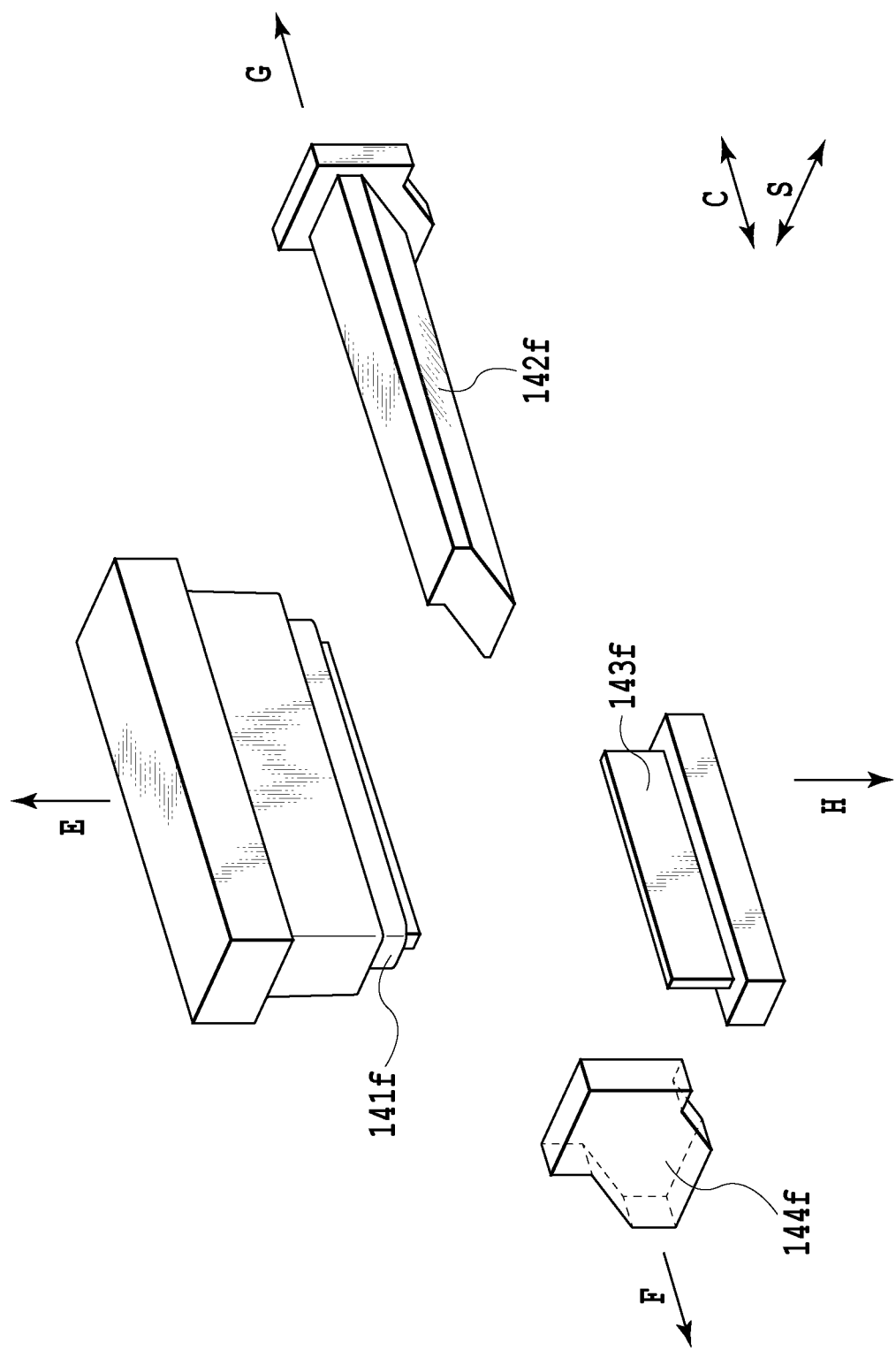

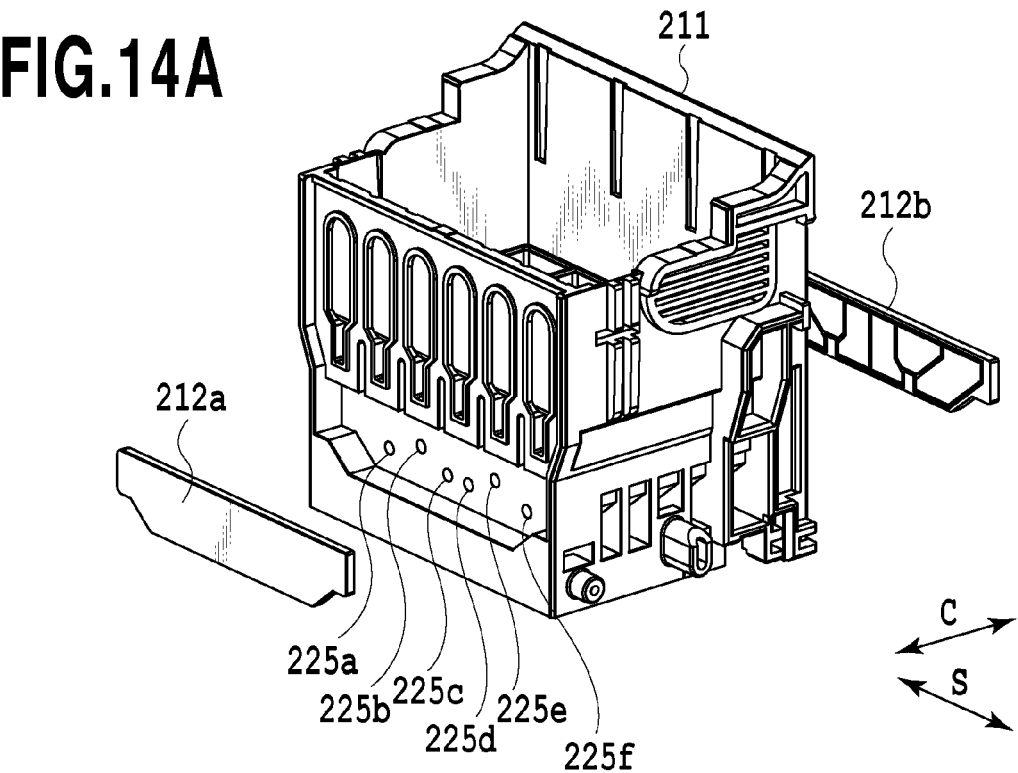
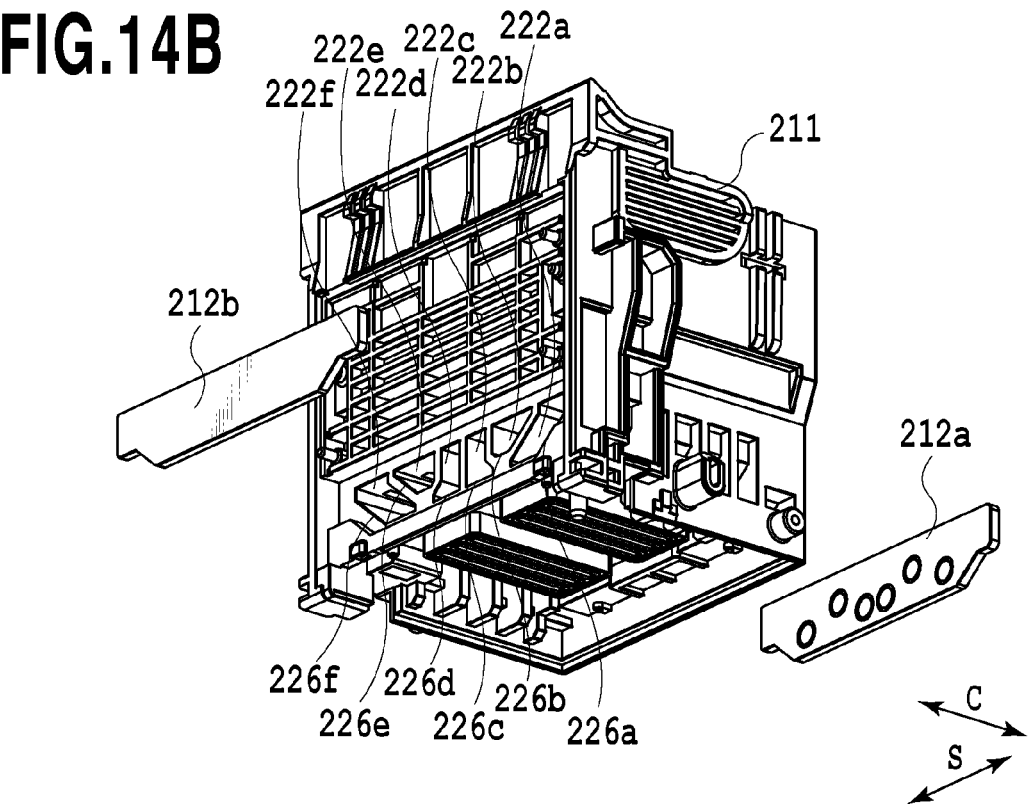

METHOD FOR MANUFACTURING MOLDED MEMBER AND LIQUID EJECTING HEAD, LIQUID EJECTING HEAD, AND MOLD

BACKGROUND OF THE INVENTION

Field of the Invention

The present invention relates to a method and a mold for manufacturing a molded member, and particularly to a method for manufacturing a liquid ejecting head, and a liquid ejecting head.

Description of the Related Art

Recently in a serial scan type inkjet printing apparatus that performs a printing operation while moving a carriage, for improving a printing speed thereof, the number of nozzles in a crossing direction crossing a scan direction is increased to broaden the print width per one scan. As a result, the amount of ink to be ejected and air bubbles to be generated by the ejection are supposed to be increased, therefore creating a demand for increasing a volume of a liquid chamber in the apparatus.

On the other hand, since a print element substrate for performing the ejection of the ink is generally formed in a compact size, a liquid chamber connected to nozzles in the print element substrate is configured such that a width of the liquid chamber in the scan direction is narrower as closer to the print element substrate. Narrowing the width of the liquid chamber in the scan direction allows a scan range of a liquid ejecting head to a width of a print medium to be narrower, and thereby printing in a higher speed is made possible.

In this manner, the liquid chamber has a tendency of being configured to be longer in the crossing direction for further increasing the volume, and has a tendency of being configured such that on cross sections taken in the scan direction and in the crossing direction, the cross-section area (particularly, width of the scan direction) is the smaller as closer to the print element substrate.

As an example of the liquid chamber the cross-section area of which is the smaller as closer to the print element substrate, Japanese Patent No. 3801003 discloses the configuration including a member that sections the liquid chamber adjacent to the print element substrate into an air retaining region having a relatively larger cross-section area and a liquid retaining region having a relatively small cross-section area.

SUMMARY OF THE INVENTION

A housing configuring the liquid chamber in the liquid ejecting head is generally manufactured in mold forming in view of costs. The simplest piece in a mold for forming a liquid chamber having a large volume is configured to be formed of two pieces made up of a cavity and a core extracted in the mold opening direction. However, according to this configuration, in a case of arranging a plurality of liquid chambers, a width of the liquid chamber in the scan direction cannot be narrower as closer to the print element substrate (nozzle), and therefore it is necessary to add a different member between the housing and the print element substrate for changing a pitch between an inlet and an outlet of an ink supply passage.

On the other hand, as means for narrowing the width in the scan direction of the liquid chamber with only one housing member as closer to the print element substrate, there is known means in which a slide piece to be extracted in a direction perpendicular to (crossing) the extracting directions of the cavity piece and the core piece is added, thus to form the liquid chamber by extracting the pieces in the three directions.

However, in this configuration, at the molding of the molded member, the cavity piece and the core piece respectively abut on the slide piece, but a tip end of the slide piece does not abut on either of the pieces and therefore the tip end side of the slide piece is not fixed, thus forming the slide piece as a cantilever beam. At the molding, the pieces are subjected to pressures by a pressure of a resin flowing in the mold and a retaining pressure for stabilizing a shape of the resin after being filled. Particularly when a pressure is applied on the tip end side of the slide piece formed as the cantilever beam, the influence is large, so that an abutting state of each of the cavity piece and the core piece on the slide piece is inclined to be unstable.

In a case where the abutting state of the pieces each other is unstable, the resin enters into between the abutting parts to more easily generate burrs. The burr in the flow passage part of the liquid ejecting head has a particularly large impact on printing. For example, the burr in the liquid chamber is separated and falls down in the middle of using the liquid ejecting head, which causes interruption of the ink supply to the nozzle or stagnation of air bubbles in the liquid chamber, thus possibly generating a print defect.

Therefore the present invention is made in view of the aforementioned problems, and an object of the present invention is to provide a method and a mold for manufacturing a molded member having a hollow part a shape of which varies, and particularly to a method for manufacturing a liquid ejecting head that can suppress generation of burrs at the molding.

For achieving the above object, a method for manufacturing a molded member according to the present invention is a method for manufacturing a molded member having a hollow part, characterized in that the hollow part is molded by extracting a first piece, a second piece, a third piece and a fourth piece of a mold in four different directions, wherein the second piece has an elongated shape in its extracting direction, the second piece and the fourth piece have extracting directions substantially opposed to each other, and at the molding, each of the first piece, the second piece, the third piece and the fourth piece abuts on at least one of the first piece, the second piece, the third piece and the fourth piece.

According to the present invention, there can be provided a method for manufacturing a mole member in which generation of burrs is suppressed at the molding, and a mold and a molded member. According to the present invention, the liquid ejecting head that realizes a high-speed print can be provided in a low cost.

Further features of the present invention will become apparent from the following description of exemplary embodiments with reference to the attached drawings.

BRIEF DESCRIPTION OF THE DRAWINGS

FIG. 6 is a detailed perspective view illustrating the arrangement of the pieces according to the first embodiment of the present invention;

FIG. 14A and FIG. 14B are exploded perspective views each illustrating a liquid ejecting head according to a second embodiment of the present invention;

DESCRIPTION OF THE EMBODIMENTS

Hereinafter, an explanation will be made of molded members according to embodiments of the present invention by taking liquid ejecting heads that eject ink or the like as an example with reference to the attached drawings.

First Embodiment (Configuration of Liquid Ejecting Head)

An explanation will be made of the configuration of a liquid ejecting head 100 according to a first embodiment of the present invention with reference to FIG. 1 to FIG. 3.

Figure 1:
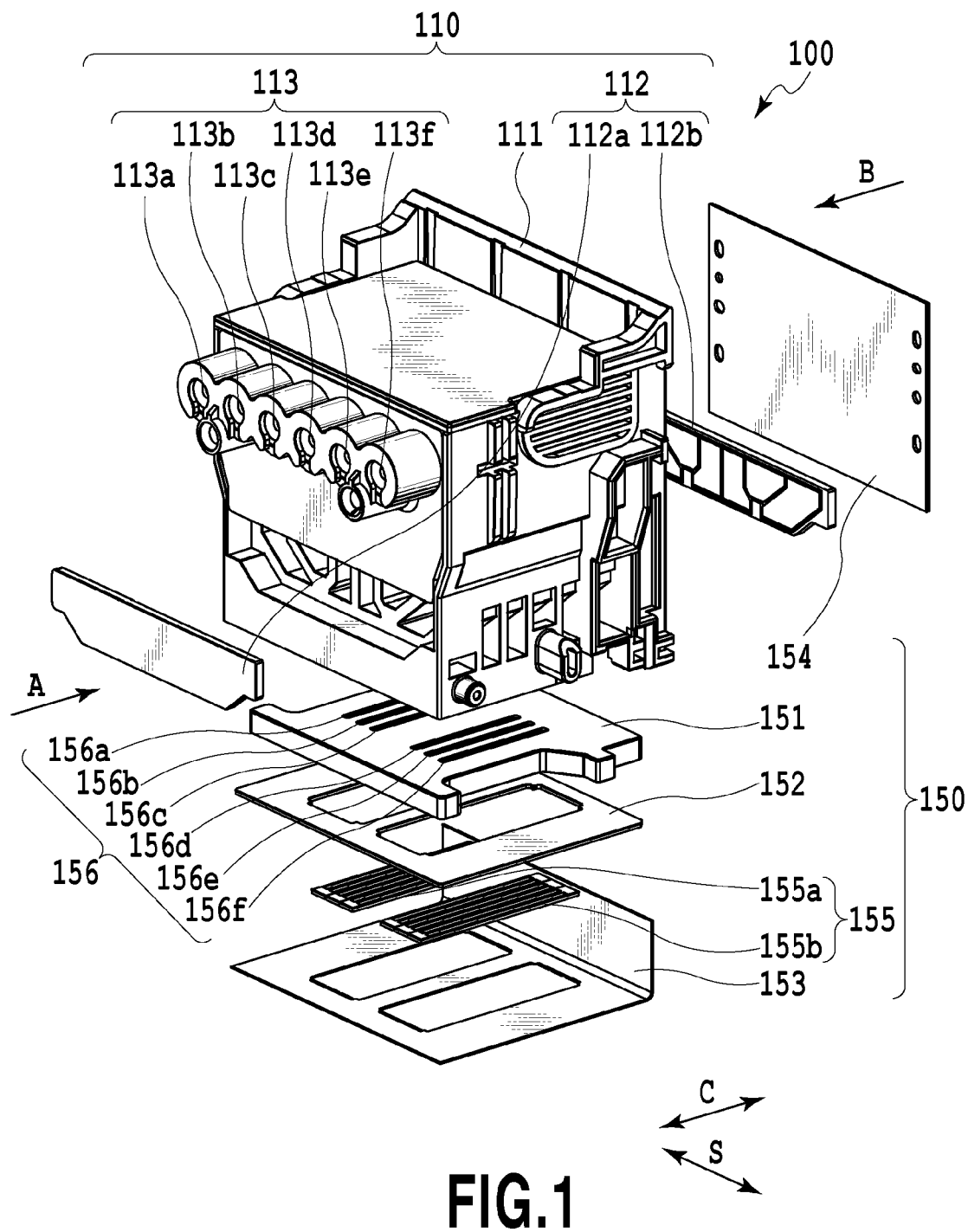
FIG. 1 is an exploded perspective view illustrating a liquid ejecting head according to a first embodiment of the present invention.

FIG. 1 is an exploded perspective view illustrating the liquid ejecting head 100 according to the first embodiment. FIG. 2 is a plan view illustrating the liquid ejecting head 100 with a lid member 112a removed, as viewed from a direction of an arrow A in FIG. 1.

The liquid ejecting head 100 includes an ink supply unit 110, and a print element unit 150 that receives supply of ink as printing liquids from the ink supply unit 110 and ejects the ink on a print medium. The liquid ejecting head 100 is fixed and supported to a carriage by positioning means of the carriage and electrical contacts disposed in an inkjet printing apparatus (not illustrated), and is removable to the carriage. The liquid ejecting head 100 is fixed and supported to the carriage, and performs a scan in a scan direction indicated in an arrow S in FIG. 1 and ejects ink for printing.

The inkjet printing apparatus is provided with ink supply tubes (not illustrated) connected to ink tanks (not illustrated) as a supply source of the ink, and a distal end of the ink supply tube is provided with a liquid connector. When the liquid ejecting head 100 is mounted on the inkjet printing apparatus, the liquid connectors are air-tightly connected to liquid connector insert ports 113 disposed in a housing 111 of the ink supply unit 110 in the liquid ejecting head 100. Also, the ink in the ink tank is supplied to the liquid ejecting head 100.

The present embodiment includes the liquid ejecting head that can mount six kinds of inks therein. The liquid connector insert ports 113a to 113f are disposed to correspond to the respective ink supply tubes to form supply passages individually.

Figure 2:
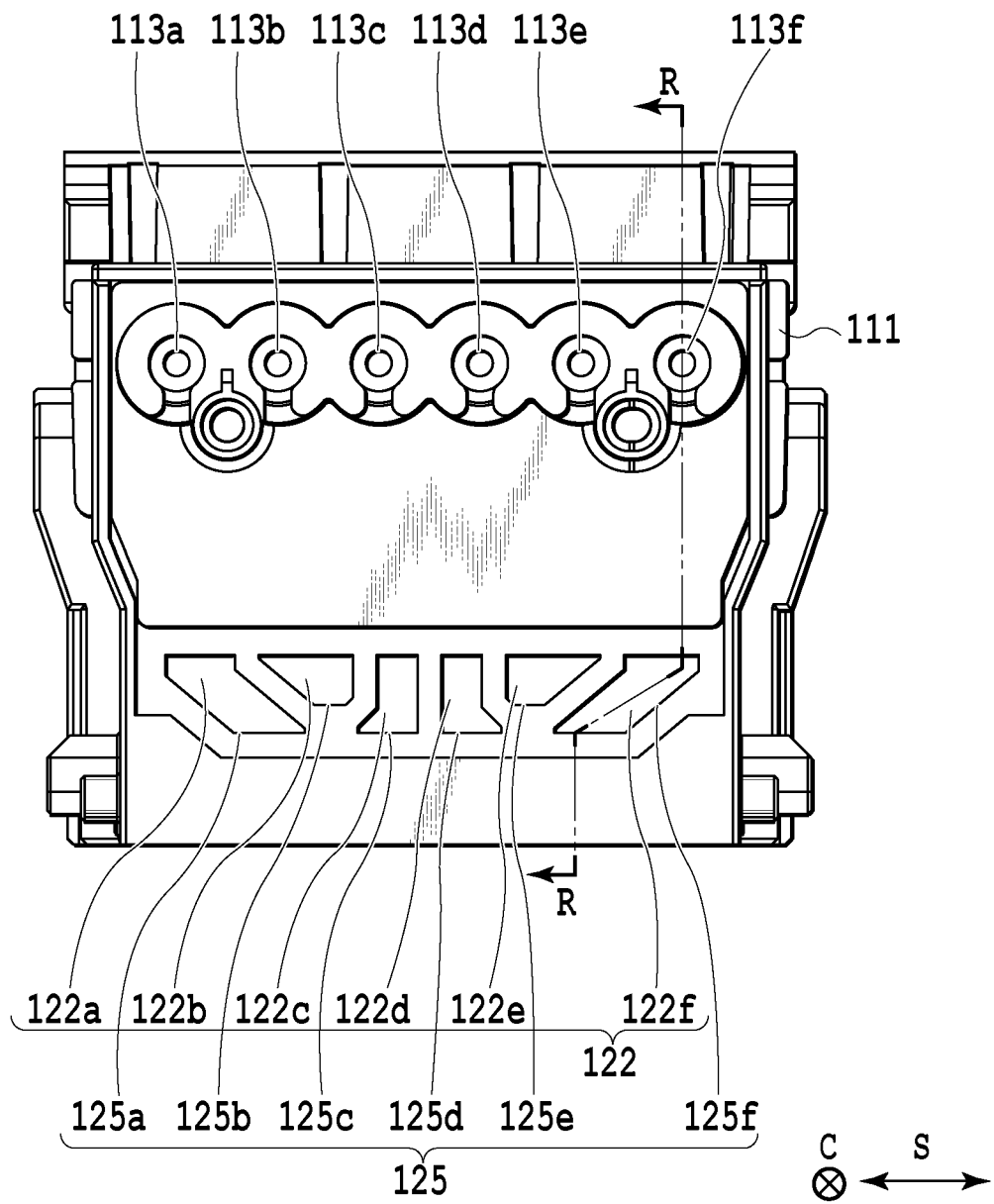
FIG. 2 is a plan view illustrating the liquid ejecting head according to the first embodiment of the present invention.
Figure 3:
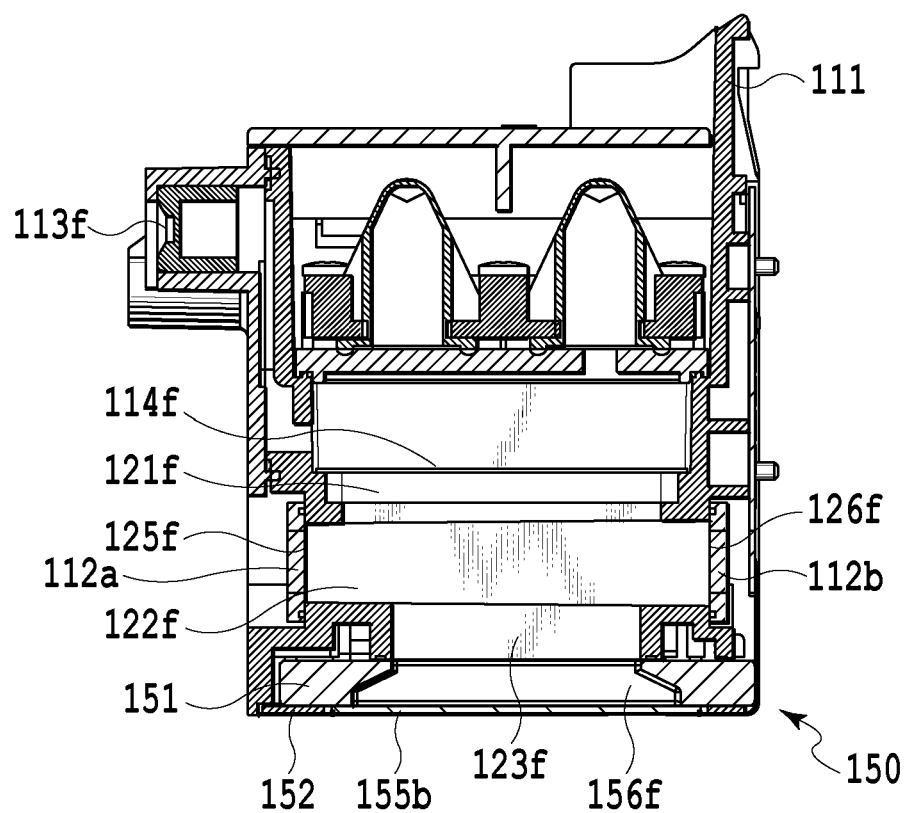
FIG. 3 is a cross section illustrating the liquid ejecting head according to the first embodiment of the present invention.

FIG. 3 is a cross section taken along line R-R in FIG. 2, and indicates the ink supply passage from the liquid connector insert port 113f to the print element unit 150. A lid member 112a is not illustrated in FIG. 2, but is illustrated in FIG. 3. The ink supplied from the liquid connector insert port 113f is supplied to the print element unit 150 through a filter 114f for preventing foreign objects from being mixed into a print element substrate 155b via a first liquid chamber 121f, a second liquid chamber 122f and a third liquid chamber 123f. The ink supplied to the print element unit 150 is ejected from nozzles disposed in the print element unit 150.

As illustrated in FIG. 3, a space as a liquid chamber from the filter 114f of the ink supply unit 110 to the print element unit 150 is structured of the first liquid chamber 121f, the second liquid chamber 122f and the third liquid chamber 123f communicated in order. The filter 114f extends in the crossing direction C indicated in a double-headed arrow in the figure. The crossing direction C is a direction crossing the scan direction S of the liquid ejecting head 100, and is regularly a direction perpendicular to the scan direction S, but may be inclined thereto.

The first liquid chamber 121f is a space between the filter 114 and the second liquid chamber 122f, and in the present embodiment, is substantially a cuboid. The first liquid chamber 121f has a boundary a part of which is formed by the filter 114, and is communicated with the filter 114. The second liquid chamber 122f is formed by the housing 111, the lid member 112a for closing an opening part 125f, and a lid member 112b for closing an opening part 126f. The second liquid chamber 122f extends in the crossing direction C crossing the scan direction S of the liquid ejecting head 100. The third liquid chamber 123f is a space between the second liquid chamber 122f and an upper surface of the print element unit 150, and in the present embodiment, is substantially a cuboid.

In the present embodiment, the housing 111 and the lid members 112 are molded products. The scan direction S corresponds to a width direction of the second piece in the mold for molding the second liquid chamber 122 and the molded product. The crossing direction C corresponds to a direction where the width (length) in the scan direction of the second liquid chamber and the second piece increases or decreases.

The printing element unit 150 includes two print element substrates 155a, 155b (in some cases called a print element substrate 155 collectively), a first support member 151, a second support member 152, an electrical wire member (electrical wire tape) 153, and an electrical contact substrate 154. The print element substrate 155 in the print element unit 150 is provided with a substrate (hereinafter called a silicon substrate) made up of silicon having a thickness of 0.5 to 1 mm, and an energy generating element disposed on one surface of the silicon substrate and generating energy to be used for ejecting liquids. In the present embodiment a plurality of heating resistance elements (heaters) are used as the energy generating element, and electrical wires that supply power to the respective heating resistance elements are formed on the silicon substrate by a film formation technique. A plurality of ink passages corresponding to the heating resistance elements and a plurality of ejection ports that eject ink are formed on the silicon substrate by a photo lithography technique. Ink supply ports that supply ink to the plurality of ink passages are open to the backside of the silicon substrate.

The print element substrate 155 adheres and is fixed to the first support member 151 provided with ink supply ports 156a to 156f. The first support member 151 is provided with the six ink supply ports 156a to 156f, which are respectively connected to third liquid chambers 123a to 123f. The second support member 152 having opening parts adheres and is fixed to the first support member 151. The electrical wire member 153 is retained on the second support member 152 so as to be connected electrically to the print element substrate 155. The electrical wire member 153 applies an electrical signal to the printing element substrate 155 for ejecting ink. An electrical connection part between the print element substrate 155 and the electrical wire member 153 is sealed by a sealing member to be protected from corrosion by ink and an external impact. The electrical contact substrate 154 is thermal compression-bonded and electrically connected to an end of the electrical wire member 153 using an anisotropic conductive film (not illustrated). The electrical contact substrate 154 has an external signal input terminal for receiving an electrical signal from the inkjet printing apparatus.

(Manufacturing Method and Mold)

Next, an explanation will be made of a method for manufacturing the first liquid chamber 121, the second liquid chamber 122 and the third liquid chamber 123 formed in the housing 111 in the ink supply unit 110, and a mold therefor with reference to FIG. 4A and FIG. 7B.

Figure 4A:
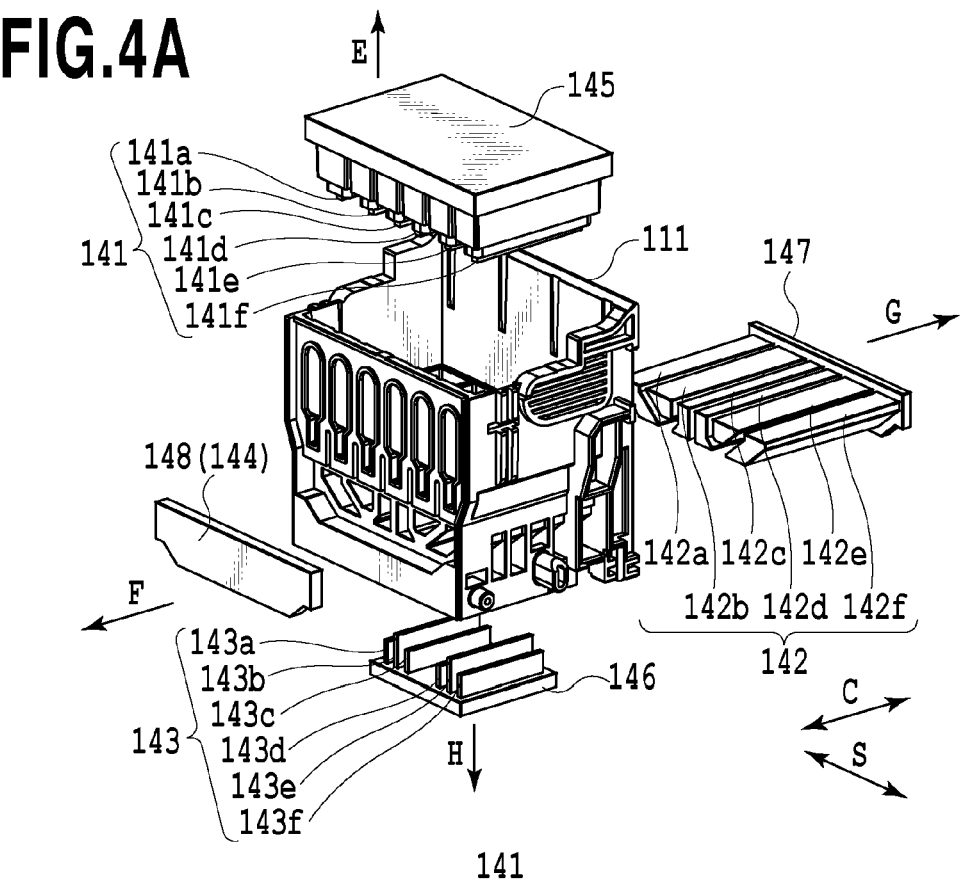
FIG. 4A and FIG. 4B are perspective views each illustrating arrangement of pieces according to the first embodiment of the present invention.
Figure 4B:
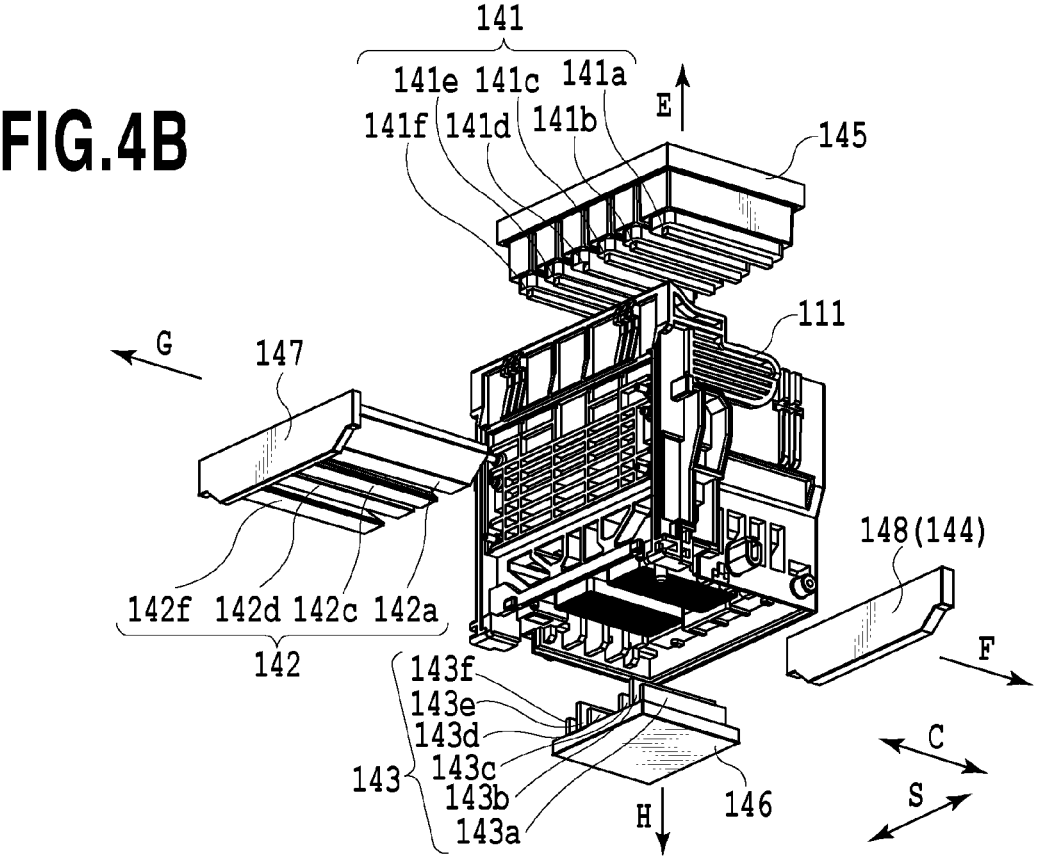

FIG. 4A and FIG. 4B are perspective views each illustrating a state of the housing 111 and pieces of the mold (core mold) after extracting the pieces of the mold in the manufacturing process of the housing 111 as the molded product. The mold used for manufacturing the housing 111 as the molded product includes unillustrated paired templates for defining an outer shape of the housing 111, and a first piece 141, a second piece 142, a third piece 143 and a fourth piece 144 for forming a space as a liquid chamber of the housing 111. First pieces 141a to 141f, second pieces 142a to 142f, third pieces 143a to 143f and fourth pieces 144a to 144f (unillustrated in detail) respectively may be separately structured. Also, these first to fourth pieces each may be one component integrally structured by, for example, plates 145, 146, 147 and 148 respectively.

Since methods for manufacturing the six sets of the first liquid chamber to the six third liquid chamber, the sets arrayed in parallel, each are the same method, an explanation will be made of the details thereof using the first liquid chamber 121f, the second liquid chamber 122f and the third liquid chamber 123f.

Figure 5:
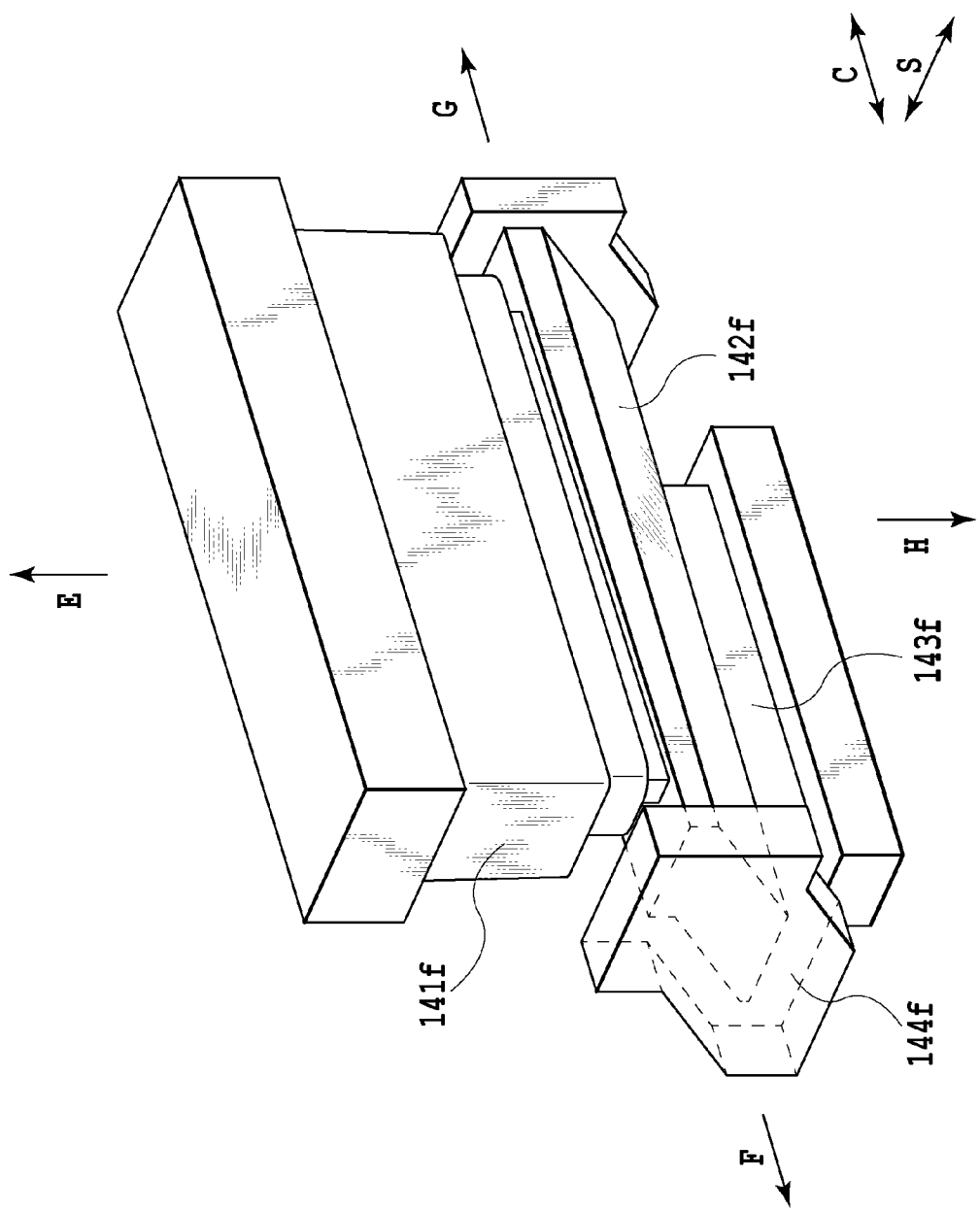
FIG. 5 is a detailed perspective view illustrating the arrangement of the pieces according to the first embodiment of the present invention.
Figure 7A:
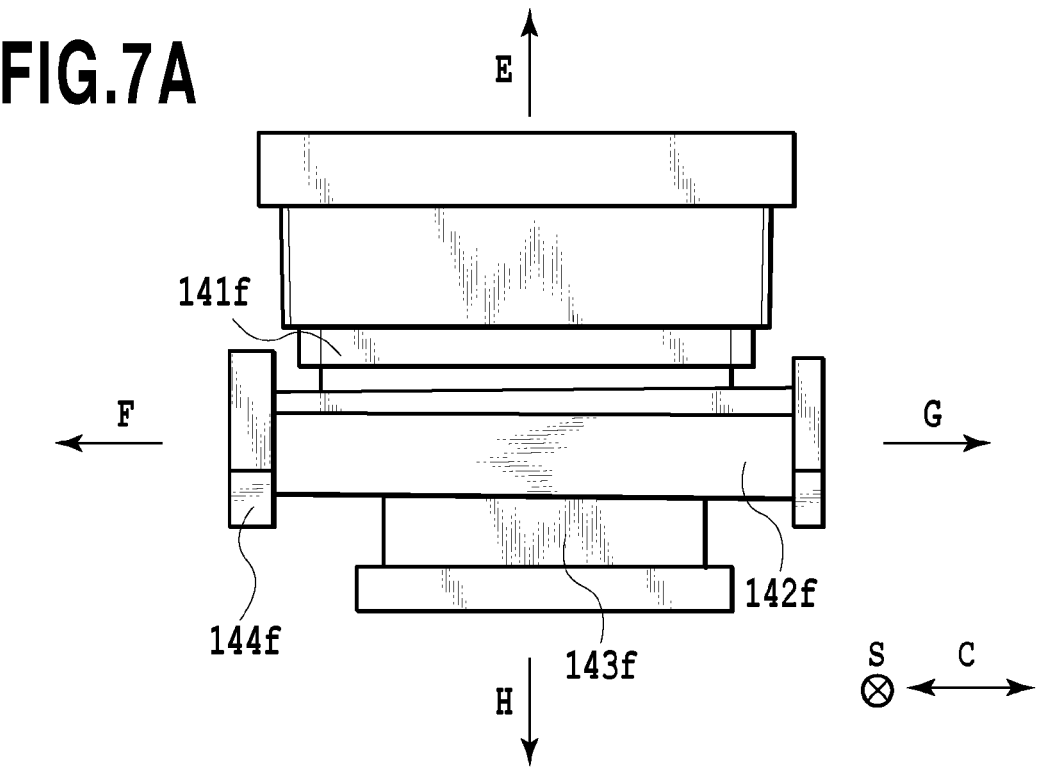
FIG. 7A is a detailed plan view illustrating the arrangement of the pieces according to the first embodiment of the present invention.

FIG. 5 is a perspective view illustrating arrangement of only pieces of the mold for forming the first liquid chamber 121f, the second liquid chamber 122f and the third liquid chamber 123f at the molding. FIG. 6 is a perspective view illustrating a state where the pieces in FIG. 5 are respectively extracted. FIG. 7A is a front view illustrating the arrangement of the pieces of the mold in FIG. 5 as viewed in a direction of the scan direction S, and FIG. 7B is a front view illustrating the arrangement with the fourth piece 144f in FIG. 7A removed, as viewed from a position where an arrow F is present in FIG. 7A.

The first liquid chamber 121f is formed by the first piece 141f, which is extracted in a direction E indicated in FIG. 4A to FIG. 7B. The third liquid chamber 123f is formed by the third piece 143f, which is extracted in a direction H indicated in FIG. 4A to FIG. 7B. The second liquid chamber 122f is formed by the second piece 142f having a shape long in the crossing direction C and the fourth piece 144f, which are respectively extracted in a direction G and in a direction F indicated in FIG. 4A to FIG. 7B. That is, the first piece, the second piece, the third piece and the fourth piece are extracted in the four directions. The first piece and the third piece are extracted in substantially opposing directions. The second piece and the fourth piece are extracted in substantially opposing directions. The extraction directions of the first piece and the third piece may be substantially perpendicular to the extraction directions of the second piece and the fourth piece.

The second piece has an elongated shape in the crossing direction C, and an aspect ratio between a width of the second piece in the scan direction and a length of the second piece in the crossing direction C can be, for example, 1 to 4 or greater.

Figure 7B:
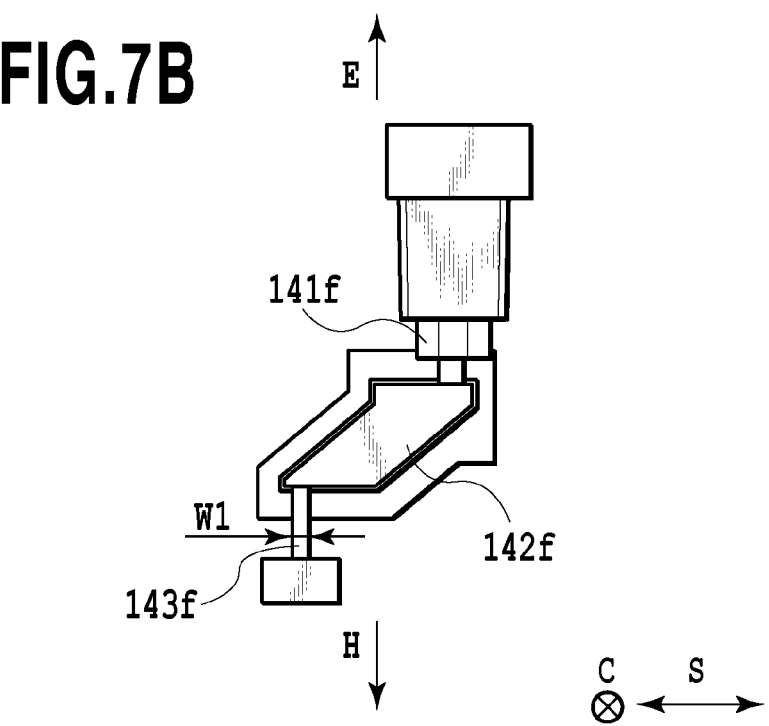
FIG. 7B is a front view illustrating the arrangement of the pieces according to the first embodiment of the present invention.

As illustrated in FIG. 7A and FIG. 7B, at the molding, a tip end of the second piece 142f abuts on the fourth piece 144f, and a tip end of each of the first piece 141f and the third piece 143f abuts on the second piece 142f.

As the procedure at the molding, after causing the second piece 142f to abut on the fourth piece 144f, the first piece 141f and the third piece 143f are caused to abut on the second piece 142f. Subsequently a resin starts to be filled between templates of the mold. After the filling of the resin is completed, a retaining pressure is applied for stabilizing the shape of the housing 111. Thereafter, the resin is cooled in the mold for causing the resin to cure, and then the templates are opened to extract the respective pieces, thus forming the housing 111.

Comparative Example

Figure 8A:
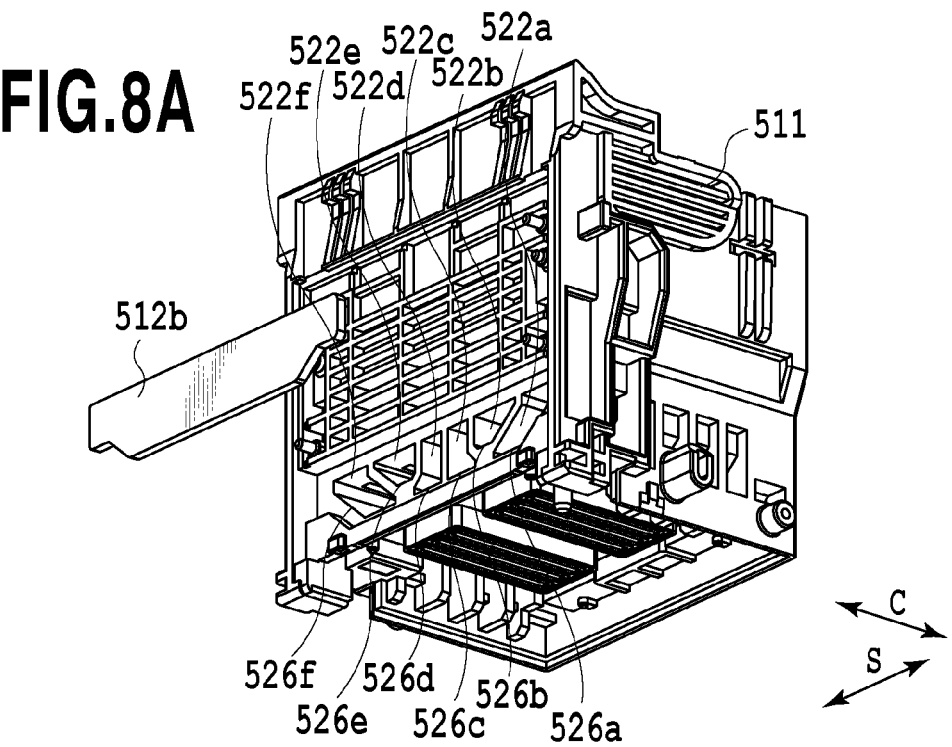
FIG. 8A and FIG. 8B are perspective views each illustrating a liquid ejecting head and arrangement of pieces according to a comparative example to the present invention.

Next, an explanation will be made of a comparative example with reference to FIG. 8A and FIG. 8B. FIG. 8A is an exploded perspective view illustrating a housing 511 and a lid member 512b in the comparative example. In the comparative example, second liquid chambers 522a to 522f are formed by the housing 511 and the lid member 512b for closing opening parts 526a to 526f. This comparative example is not provided with opening parts opposing the opening parts 526a to 526f, and as a result, is not provided with a lid member for closing it, either.

Figure 8B:
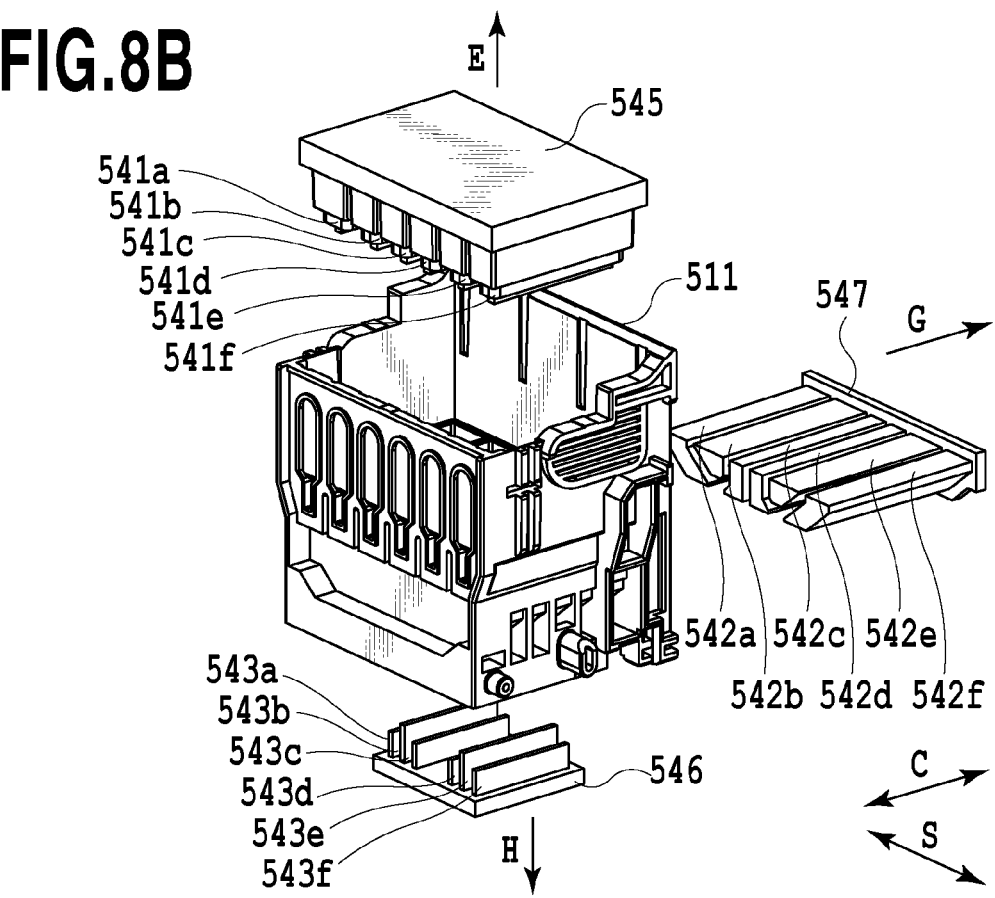

FIG. 8B is a perspective view illustrating a state of the housing 511 and pieces of a mold after extracting the pieces of the mold in the manufacturing process of the housing 11 as a molded product. Since methods for manufacturing the six sets of the first liquid chamber to the six third liquid chamber each are the same method, an explanation will be made of the details thereof using a first liquid chamber 521f (not illustrated), the second liquid chamber 522f and a third liquid chamber 523f (not illustrated).

Figure 9:
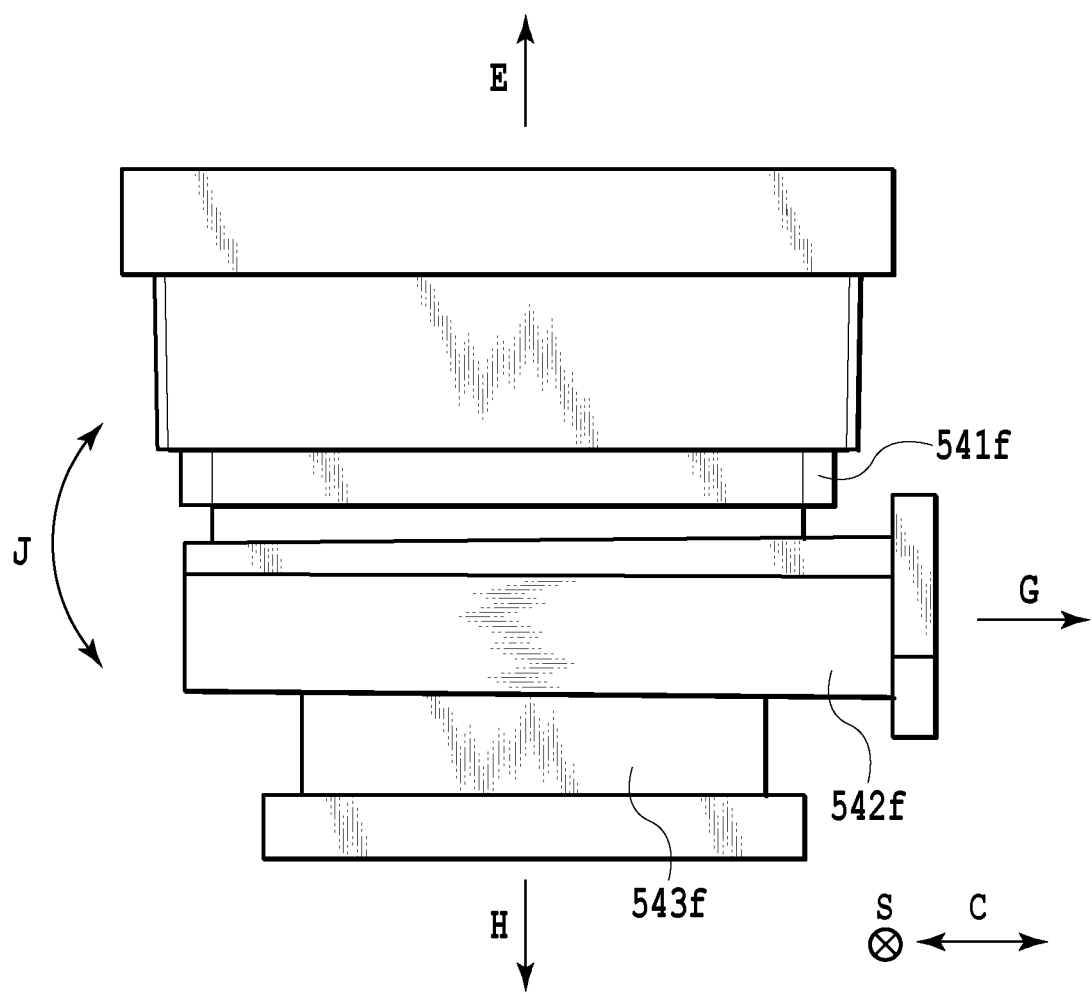
FIG. 9 is a detailed plan view illustrating the arrangement of the pieces according to the comparative example to the present invention.
Figure 10:
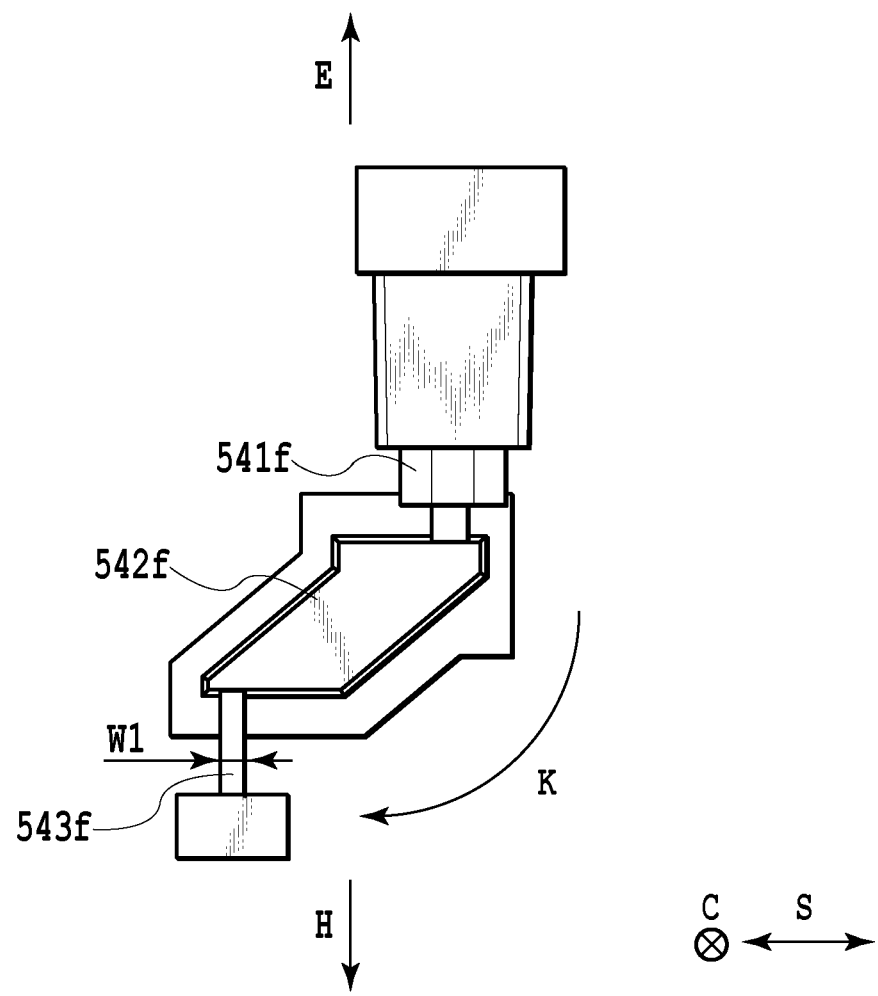
FIG. 10 is a front view illustrating the arrangement of the pieces according to the comparative example to the present invention.

FIG. 9 is a drawing explaining the configuration as the comparative example of the present invention, and is a front view illustrating arrangement of only pieces of the mold for forming the first liquid chamber 521f, the second liquid chamber 522f and the third liquid chamber 523f at the molding, as viewed in a direction of a scan direction S. FIG. 10 is a front view illustrating the arrangement indicated in FIG. 9 as viewed from the left side in FIG. 9. The first liquid chamber 521f is formed by the first piece 541f, which is extracted in a direction E indicated in FIG. 8B to FIG. 10. The third liquid chamber 523f is formed by the third piece 543f, which is extracted in a direction H indicated in FIG. 8B to FIG. 10. The second liquid chamber 522f is formed by the second piece 542f, which is extracted in a direction G indicated in FIG. 8B and FIG. 9.

As illustrated in FIG. 9, at the molding, a tip end of each of the first piece 541f and the third piece 543f abuts on the second piece 542f. On the other hand, the second piece 542f is formed in a shape long in a crossing direction C, and a tip end thereof does not abut on any piece, so that the second piece 542f is formed as a cantilever beam. Further, since a width W1 of the third piece 543f in the scan direction S is narrow, an abutting area between the second piece 542f and the third piece 543f is small, thus making the abutting state of the pieces unstable.

Therefore, due to a pressure of the resin flowing in the mold at the molding or a retaining pressure after the resin is filled, the second piece 542f is inclined to swing in a direction of an arrow J in FIG. 9 or in a direction of an arrow K in FIG. 10 (inclined to rotate or twist), thus making an abutting state between the first piece 541f and the third piece 543f unstable. As a result, there are some cases where a gap occurs between the abutting parts, and because of leakage of the resin into the gap or the like, burrs are inclined to be easily generated.

On the other hand, in the present embodiment illustrated in FIG. 7A, since the tip end of the second piece 142f abuts on the fourth piece 144f at the molding, an abutting state between the second piece 142f and the third piece 143f can be stably secured. Therefore the phenomenon that the resin leaks from the gap between the abutting parts is difficult to occur, thus making the generation of the burrs difficult.

(Modification)

The shape of the abutting parts between the second piece 142f and the fourth piece 144f is a shape vertical to the piece extracting directions G and F of each other, but the present invention is not limited thereto.

Figure 11:
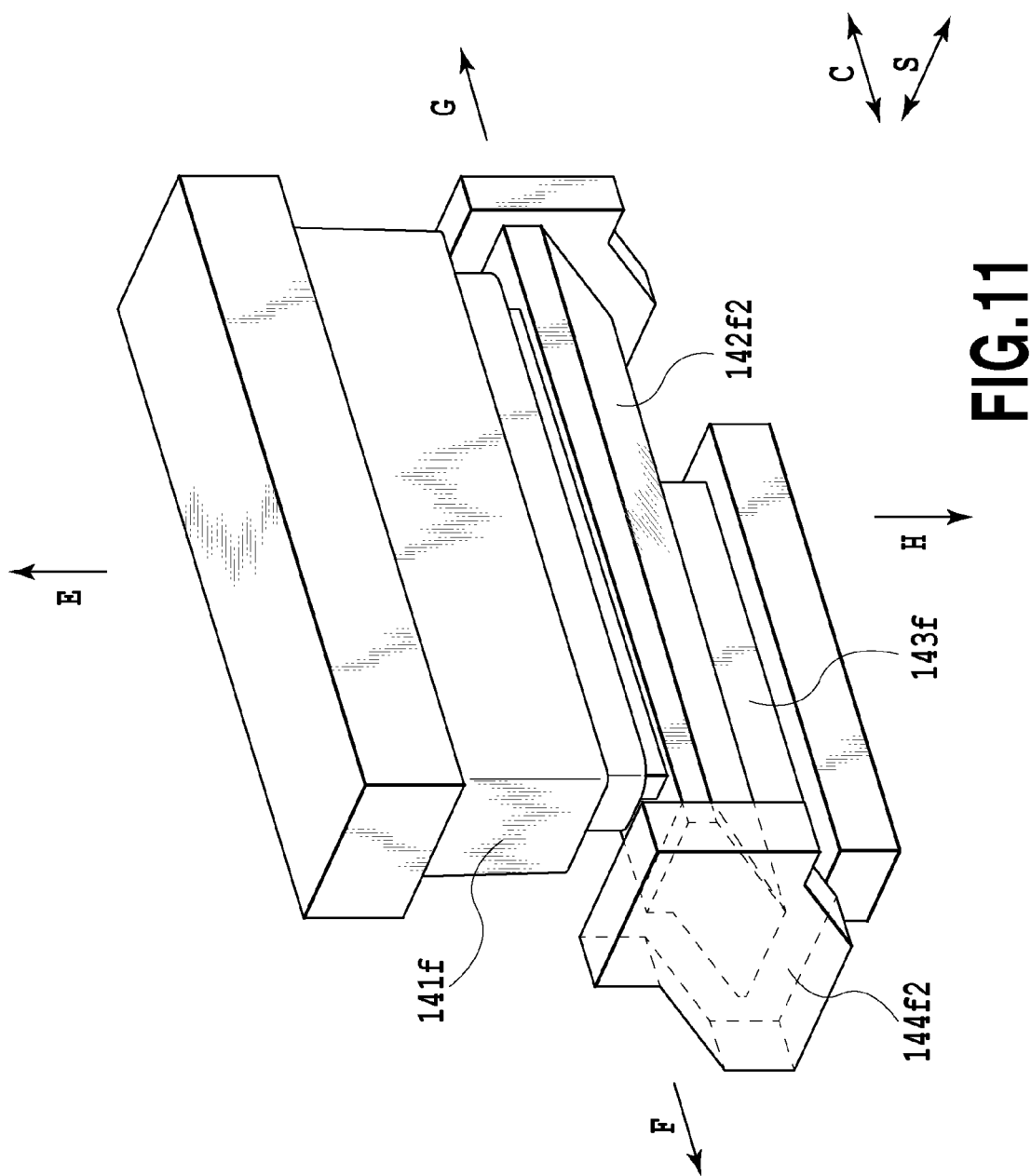
FIG. 11 is a detailed perspective view illustrating arrangement of pieces according to a modification in the first embodiment of the present invention.
Figure 12:
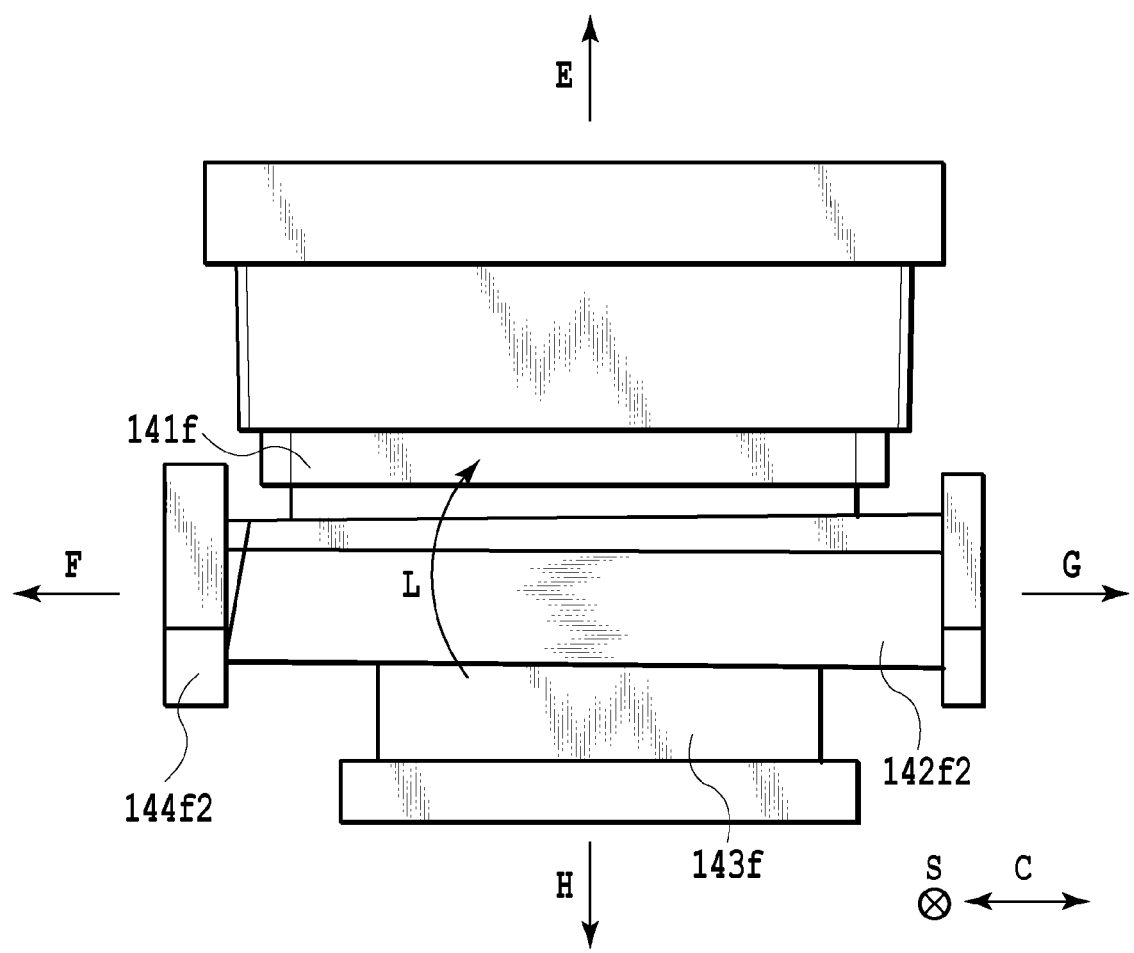
FIG. 12 is a detailed plan view illustrating the arrangement of the pieces according to the modification in the first embodiment of the present invention.
Figure 13:
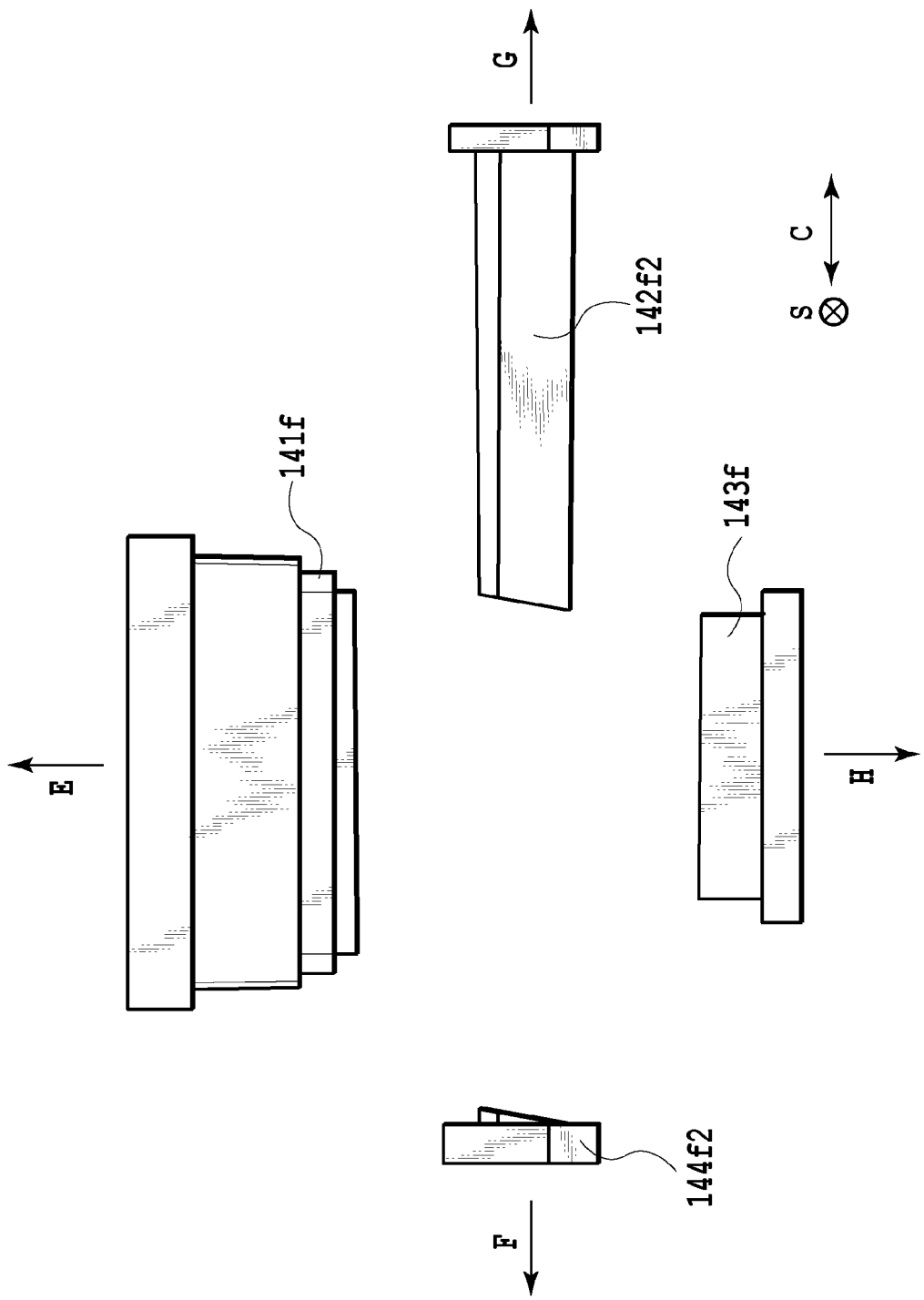
FIG. 13 is a detailed plan view illustrating the arrangement of the pieces according to the modification in the first embodiment of the present invention.

There will be illustrated a modification of the first embodiment with reference to FIG. 11 to FIG. 13. FIG. 11 is a perspective view illustrating arrangement of only pieces of the mold of forming the first liquid chamber 121f, the second liquid chamber 122f and the third liquid chamber 123f at the molding. FIG. 12 is a front view illustrating the arrangement indicated in FIG. 9 as viewed from the scan direction S in FIG. 11. FIG. 13 indicates a state where the pieces in FIG. 12 are respectively extracted, and is a front view of the state as viewed from the scan direction S.

The modification differs from the first embodiment in a point where a tip end of a second piece 142f2 is formed as an inclined surface, and a fourth piece 144f2 is formed in a convex shape having an inclined surface that can abut on the tip end. Since the abutting part is formed as the inclined surface, the abutting state can be secured more certainly against a force in a direction indicated in an arrow L in FIG. 12. With adoption of the present modification, the abutting state can be secured more certainly against the force in the direction applied on the piece at the molding as described above, making it possible to suppress generation of the burr. The adoption of the mold and the manufacturing method as described above suppress the abutting state of the pieces each other from becoming unstable at the molding of the liquid ejecting head as the molded member, thus making it possible to suppress the generation of the burr.

(Die Slide Injection Method)

The present embodiment uses two lid members 112 that are different members for forming the second liquid chamber 122. Therefore there is concern of a cost increase following an increase in number of components, but by using a die slide injection method that is a manufacturing method in which a continuous progress of injection molding of a plurality of components and jointing of these components in the same mold is made possible, the cost increase can be reduced. Hereinafter, the details will be explained.

An example of factors of the cost increase by use of the lid members 112 may include a cost of the lid members 112 itself, a management cost of the lid members 112, and an increase in cost of the processing by the jointing of the lid members 112 to the housing 111. An example of costs in the processing may include, which differs depending on the jointing method, a cost of an adhesive itself and investments of an adhesive application apparatus in a case of the jointing by the adhesive generally used, investments of a cure furnace in a case of needing cure for hardening, and processing costs in the respective processes. In addition, an example of a welding method by friction heat of components each other may include supersonic welding, vibration welding and the like. Since the supersonic welding and the vibration welding do not use adhesion members, the cost of the adhesion member does not occur, but the investment of the adhesion apparatus and the processing cost of the process occur. Further, since components are made to lap with each other for generating friction heat at the processing, unnecessary dusts are generated. Particularly since dusts in the liquid chamber cause generation of print defects, in some cases the process of removing the dusts is required.

Figure 24A:
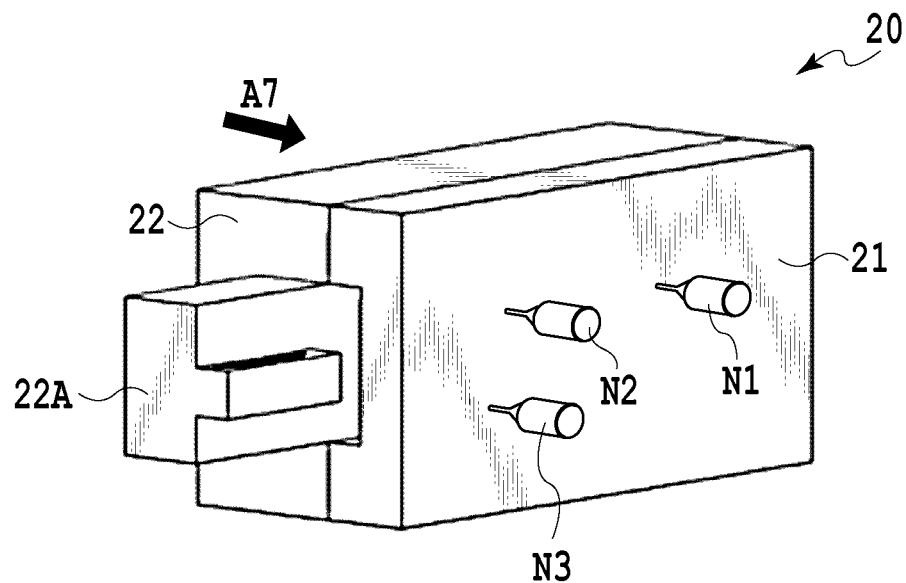
FIG. 24A and FIG. 24B are perspective views each illustrating a mold in the manufacturing stage of an ink supply member according to the first embodiment of the present invention.
Figure 24B:
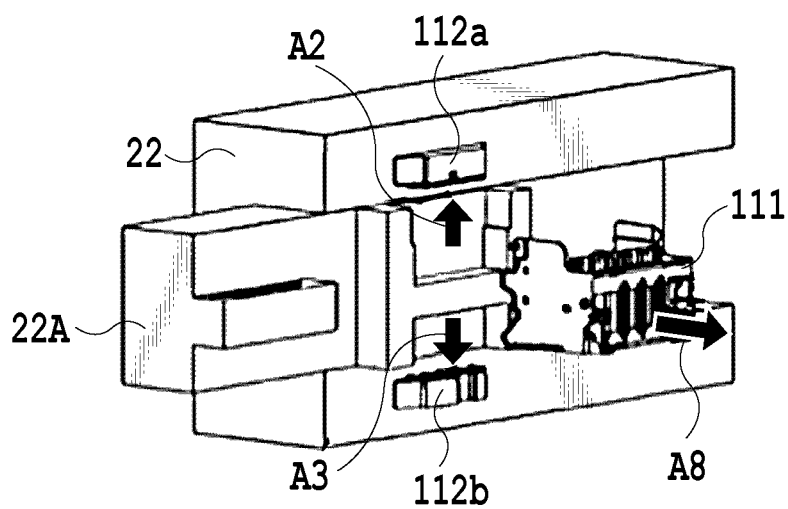
Figure 25:
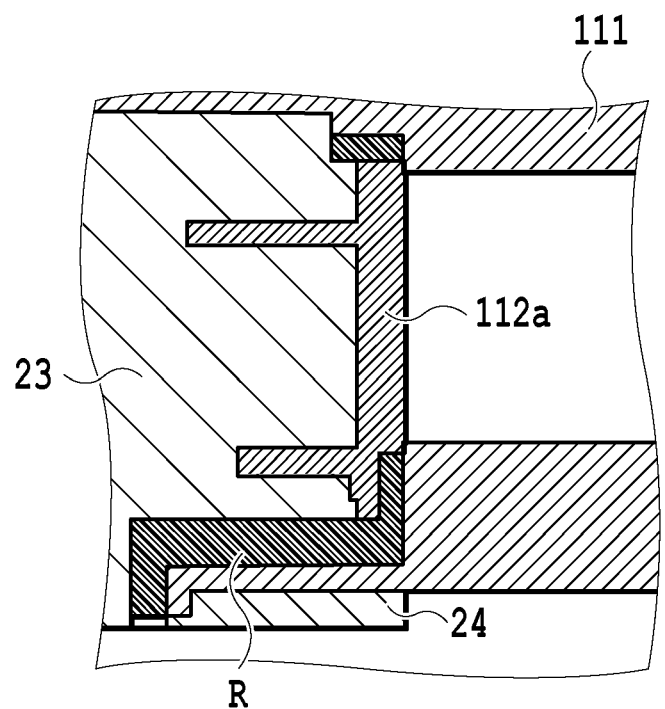
FIG. 25 is a perspective view illustrating the mold in the manufacturing stage of the ink supply member according to the first embodiment of the present invention.

On the other hand, use of the die slide injection manufacturing method as illustrated in FIG. 24A, FIG. 24B and FIG. 25 allows suppression of the aforementioned cost increase. In addition, the die slide injection manufacturing method is desirable not only in terms of costs but also in terms of molding accuracy at the time of molding each of components such as the housing, the lid member and the like, and assembling accuracy of the components of each other First, the housing 111 as the molded member and the lid members 112a, 112b are respectively molded in the same mold. Next, the mold is opened, then the die is slid such that the housing 111 and the lid member 112a, and the housing 111 and the lid member 112b respectively are arranged in positions to abut on each other, and the mold is closed. In a state where the mold is closed, resins as sealing materials are filled in between abutting parts of the housing 111 and the lid member 112a and between abutting parts of the housing 111 and the lid member 112b by injection molding to joint the abutting parts. Finally the mold is opened, and an integrated joint product of the housing 111 and the lid members 112a, 112b is removed.

In the mold 20, the housing 111 is made to abut on the lid members 112a, 112b corresponding thereto. Then in this abutting state, as illustrated in FIG. 24A a movable mold 22 moves in a direction of an arrow A7 to perform mold-clamping with a fixed mold 21. Thereafter, sealing resins (secondary resin) (refer to R in FIG. 25) compatible with the housing 111 and the lid members 112a, 112b are casted into the abutting parts between the housing 111 and the lid members 112a, 112b from an injection nozzle N3 (secondary molding). The secondary resin is filled to joint these members and complete formation of a hollow ink supply member. An explanation will be made of the joint by the secondary resin with reference to FIG. 25. As illustrated in FIG. 25, the mold clamping is performed in a state where the housing 111 abuts on the lid member 112a. In this state, the secondary resin R is injected into between the abutting parts of the housing 111 and the lid member 112a and a gap in the vicinity thereof. At this time, molds 23, 24 can suppress inflation of the members due to a pressure generated at the injecting of the secondary resin R.

With the adoption of this manufacturing method, the adhesive or the investment in the processing apparatus becomes unnecessary. Further, since the joint is performed by injection molding, there is no generation of dusts as described above, and the process of removing the dusts is unnecessary. Therefore it is possible to suppress the cost increase caused by an increase of general components. Further, since the joint is made possible without use of the adhesive or the like, this method is preferable since selectivity in material becomes wide in view of resistance to ink properties. In addition, the injection molding is performed with the resin as similar to the resin upon molding the component for jointing, and therefore the hollow component can be molded with resin materials having a linear expansion coefficient equal to each other, and this method is compatible even with a change such as inflation or deflation of the hollow component due to a change in temperature or the like after the formation.

Second Embodiment

In a second embodiment, an explanation will be made only of components and manufacturing methods different from those in the first embodiment, and an explanation of the other similar components and manufacturing methods is omitted.

FIG. 14A and FIG. 14B are exploded perspective views each illustrating a housing 211 and lid members 212a, 212b in a liquid ejecting head (an entire image thereof is not illustrated) of the second embodiment. Second liquid chambers 222a to 222f are formed by the housing 211, the lid member 212a for closing opening parts 225a to 225f each having a circular shape, and the lid member 212b for closing opening parts 226a to 226f.

Figure 15:
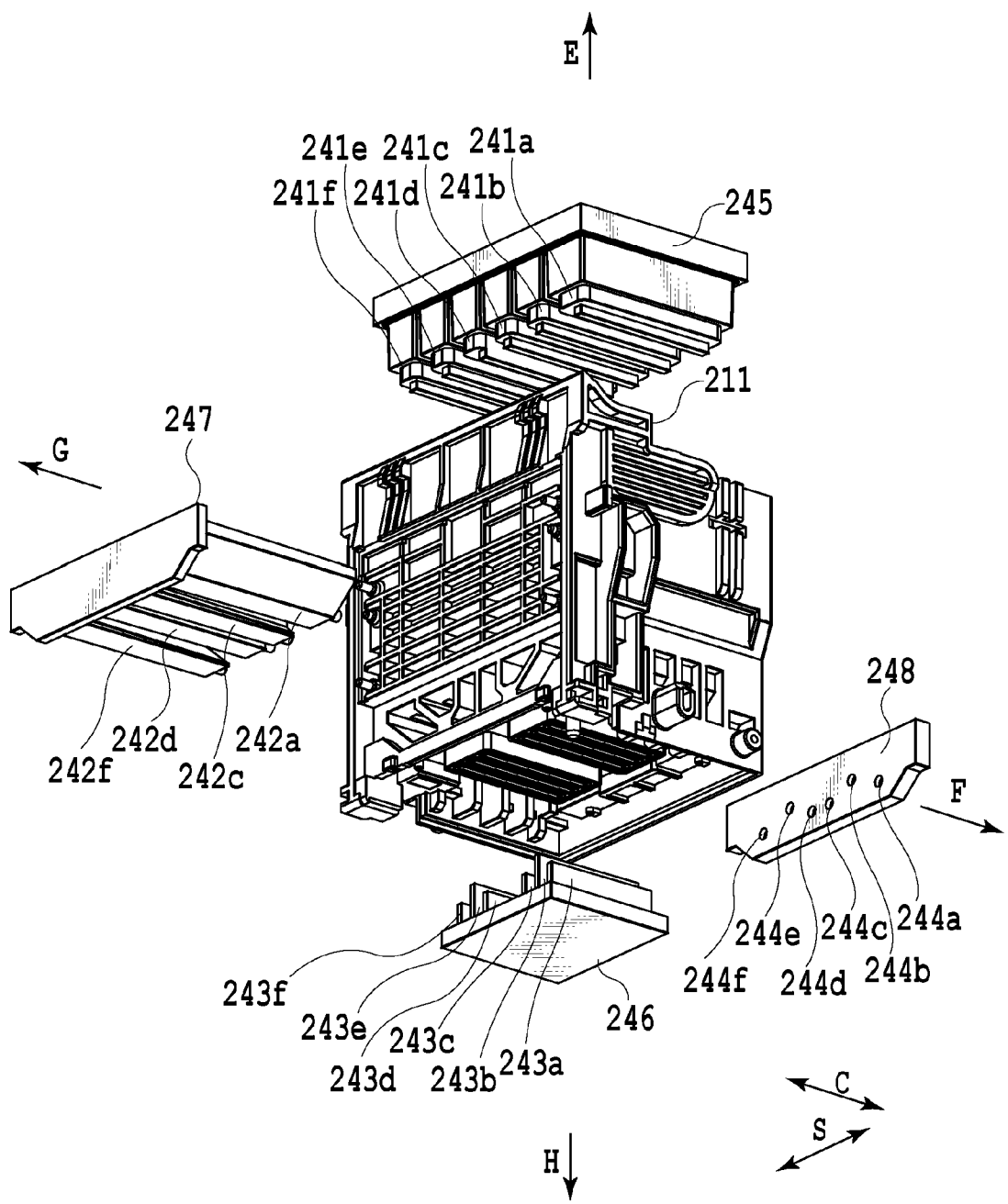
FIG. 15 is a perspective view illustrating arrangement of pieces according to the second embodiment of the present invention.

FIG. 15 is a perspective view illustrating a state of the housing 211 and pieces of the mold after extracting the pieces of the mold in the manufacturing process of the housing 211 as a molded member. Since methods for manufacturing six first liquid chambers to six third liquid chambers each are the same method, an explanation will be made of the details of the liquid chambers using a first liquid chamber 221f, the second liquid chamber 222f and a third liquid chamber 223f.

Figure 16A:
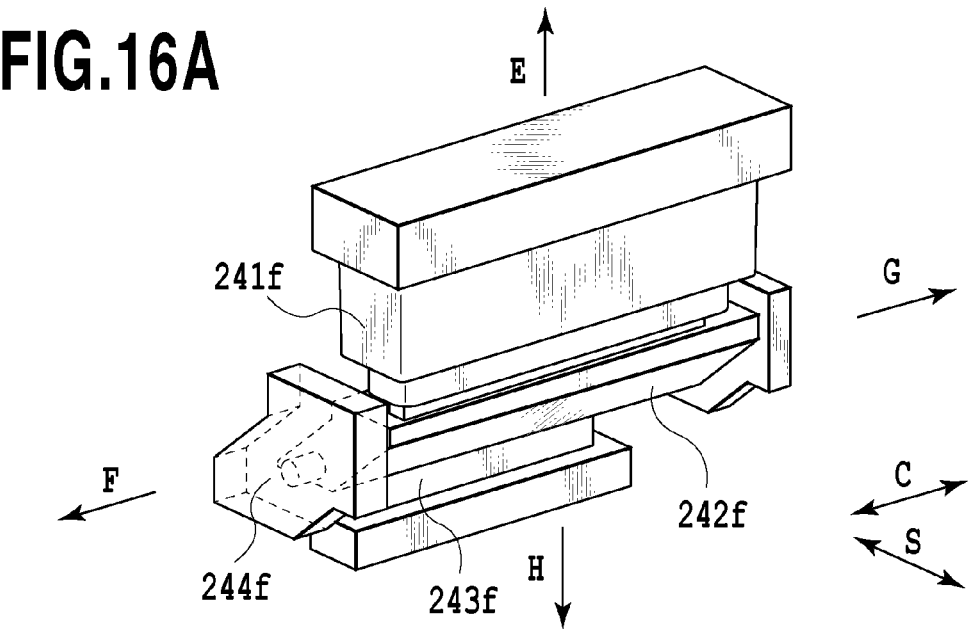
FIG. 16A and FIG. 16B are detailed perspective views each illustrating the arrangement of the pieces according to the second embodiment of the present invention.
Figure 16B:
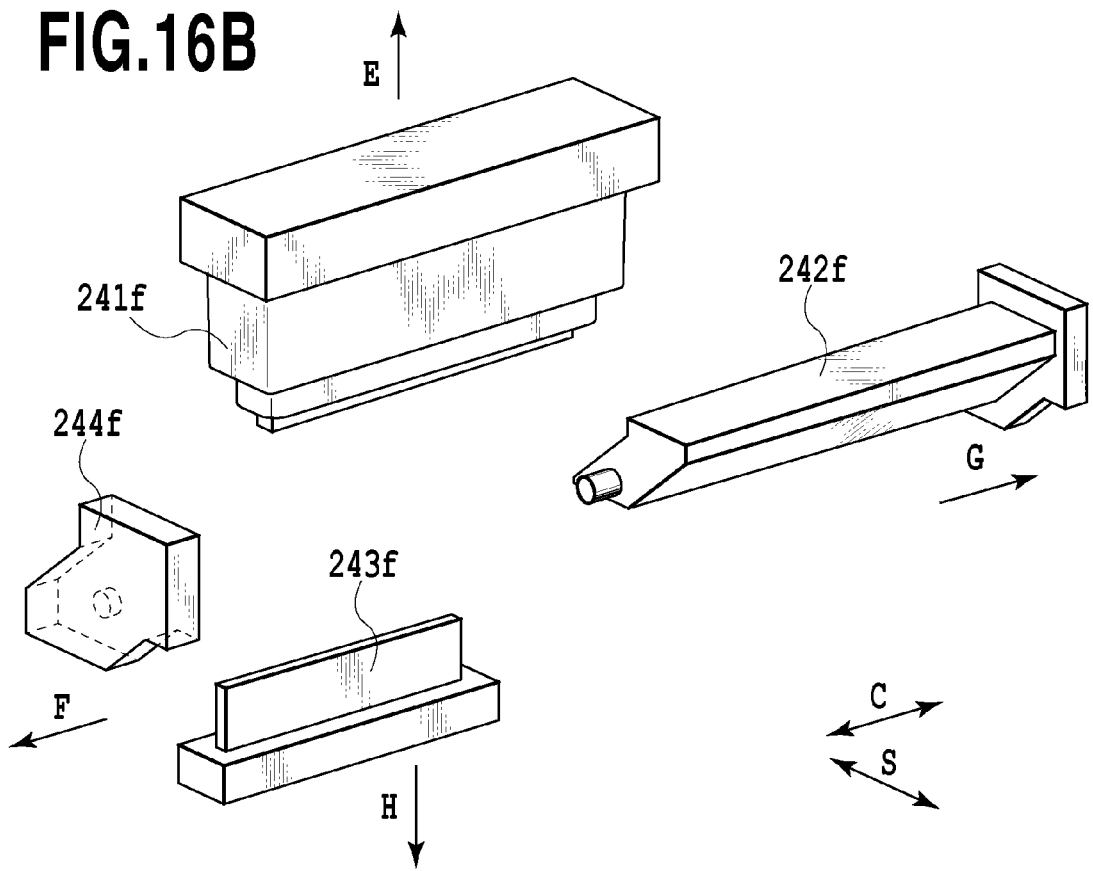
Figure 17:
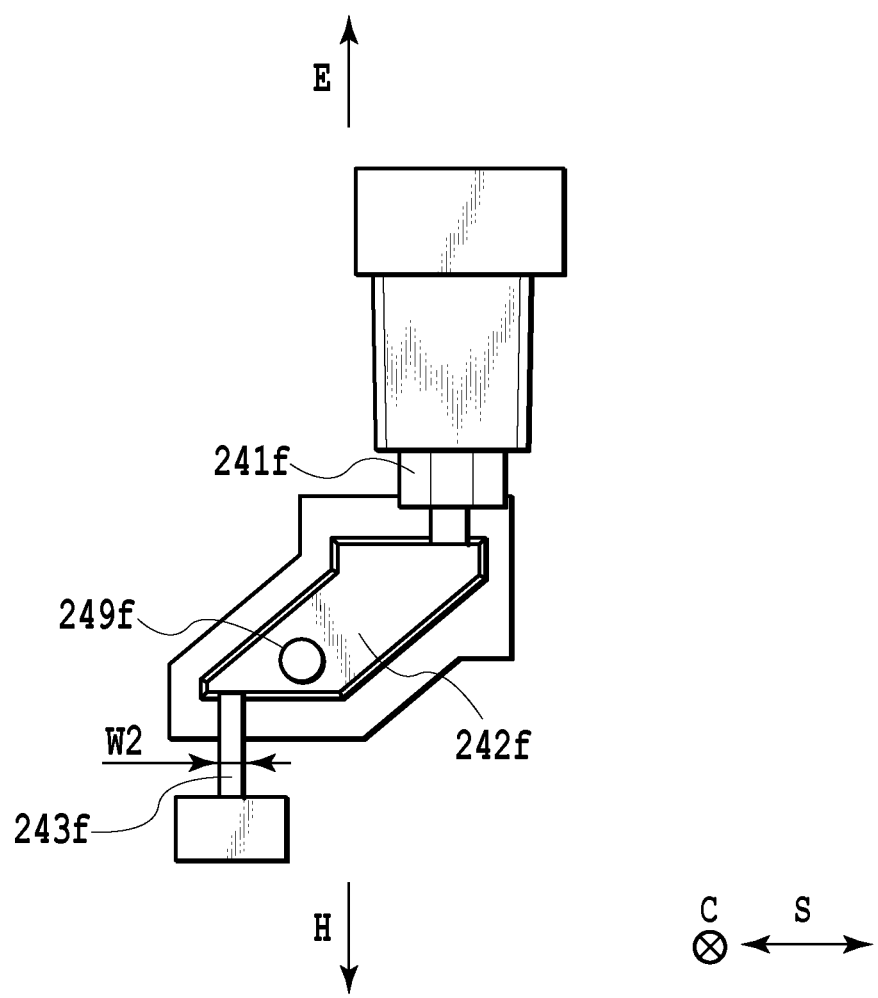
FIG. 17 is a front plan view illustrating the arrangement of the pieces according to the second embodiment of the present invention.

FIG. 16A is a perspective view illustrating arrangement of only pieces of the mold of forming the first liquid chamber 221f, the second liquid chamber 222f and the third liquid chamber 223f at the molding. FIG. 16B is a perspective view illustrating a state where the pieces in FIG. 16A are respectively extracted. FIG. 17 is a front view illustrating the arrangement of the pieces of the mold at the molding with the fourth piece 244f removed in FIG. 16A, as viewed from an arrow F in FIG. 16A.

The first liquid chamber 221f is formed by the first piece 241f, which is extracted in a direction E indicated in FIG. 15 to FIG. 17. The third liquid chamber 223f is formed by the third piece 243f, which is extracted in a direction H indicated in FIG. 15 to FIG. 17. The second liquid chamber 222f is formed by the second piece 242f and the fourth piece 244f, which are respectively extracted in a direction G and in a direction F indicated in FIG. 15, FIG. 16A and FIG. 16B. That is, the first piece, the second piece, the third piece and the fourth piece are extracted in the four directions. The first piece and the third piece are extracted in substantially opposing directions. The second piece and the fourth piece are extracted in substantially opposing directions. The extraction direction of the first piece and the third piece may be substantially vertical to the extraction direction of the second piece and the fourth piece.

The second piece is formed in a shape long in the crossing direction C, and an aspect ratio between a width in the scan direction S and a length in the crossing direction C may be, for example, 1 to 4 or more.

As illustrated in FIG. 17, at the molding, a tip end of each of the first piece 241f and the third piece 243f abuts on the second piece 242f. As illustrated in FIG. 15, the fourth piece 244f is formed as a hole in a circular shape to be capable of being fitted in a tip end 249f of the second piece 242f that is a pin having a circular shape, and at the molding, the fourth piece 244f and the tip end 249f are fitted to each other as illustrated in FIG. 16A.

The fitting parts of the pieces each other require a high degree of dimension accuracy because of repeatability. In the present embodiment, since the simple circular pin and hole are adopted in the fitting part, the processing accuracy of the piece can be easily put out, and the processing of the piece is also easy. It should be noted that a relation between the pin and the hole may be in reverse thereto.

Since the second piece 242f is long in the crossing direction C and a width W2 of the third piece 243f in the scan direction S is narrow, the abutting part has such a shape as to be inclined to be unstable. However, at the molding, as described above, the second piece 242f is fitted in the fourth piece 244f to be securely fixed to, and the abutting state can be stably secured. Further, the fitting part is arranged closer to the abutting part between the second piece 242f and the third piece 243f having a narrow width of the piece and a small abutting area among the abutting parts of the first piece 241f and the third piece 243f abutting on the second piece 242f, it is possible to stably secure the abutting state more certainly.

It should be noted that, as illustrated in FIG. 15, in the present embodiment, combinations of a plurality of second pieces and a plurality of third pieces forming a plurality of second liquid chambers are respectively provided with fitting parts, but the present invention is not limited thereto. For example, in a plurality of the second liquid chambers lining up in a line, the fitting part may be provided in at least a combination of a second piece and a third piece for the second liquid chamber at the outermost side.

Figure 18A:
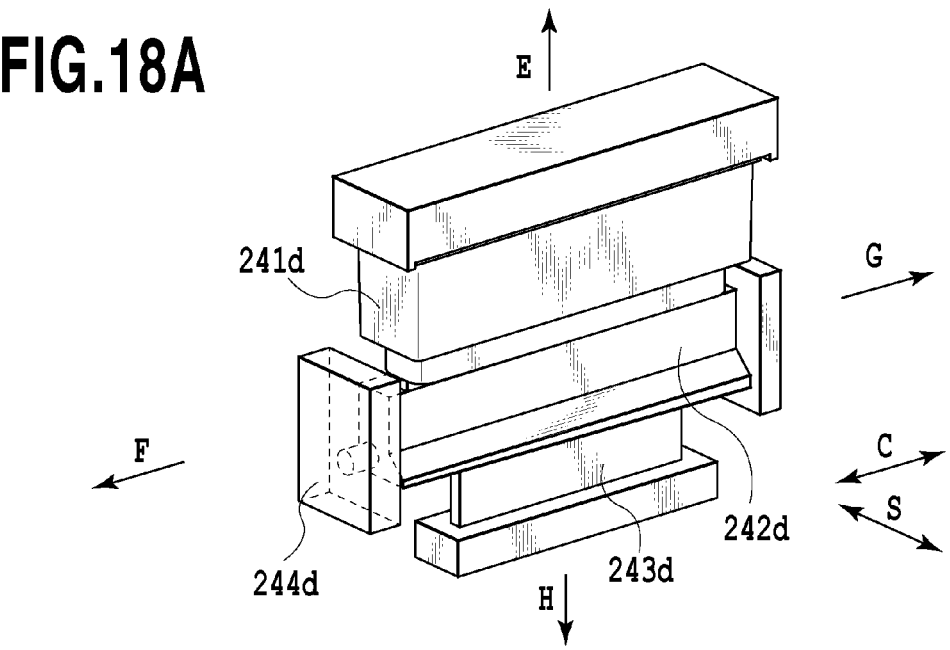
FIG. 18A and FIG. 18B are detailed perspective views each illustrating the arrangement of the pieces according to the second embodiment of the present invention.
Figure 18B:
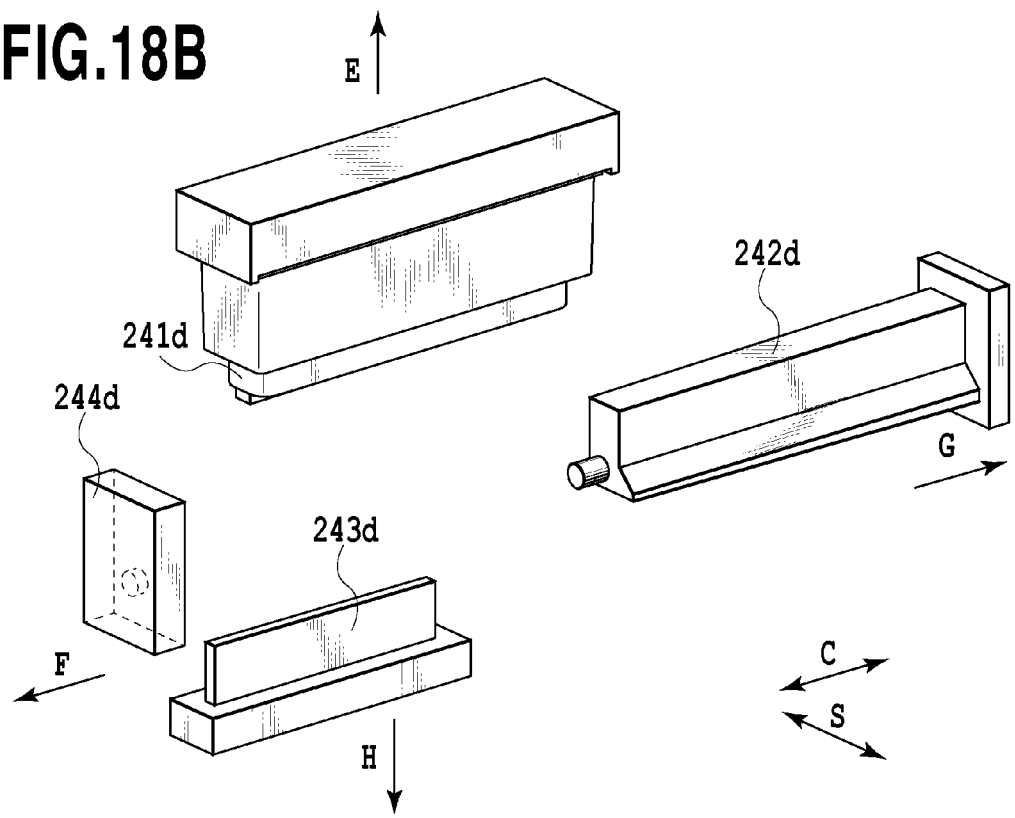
Figure 19:
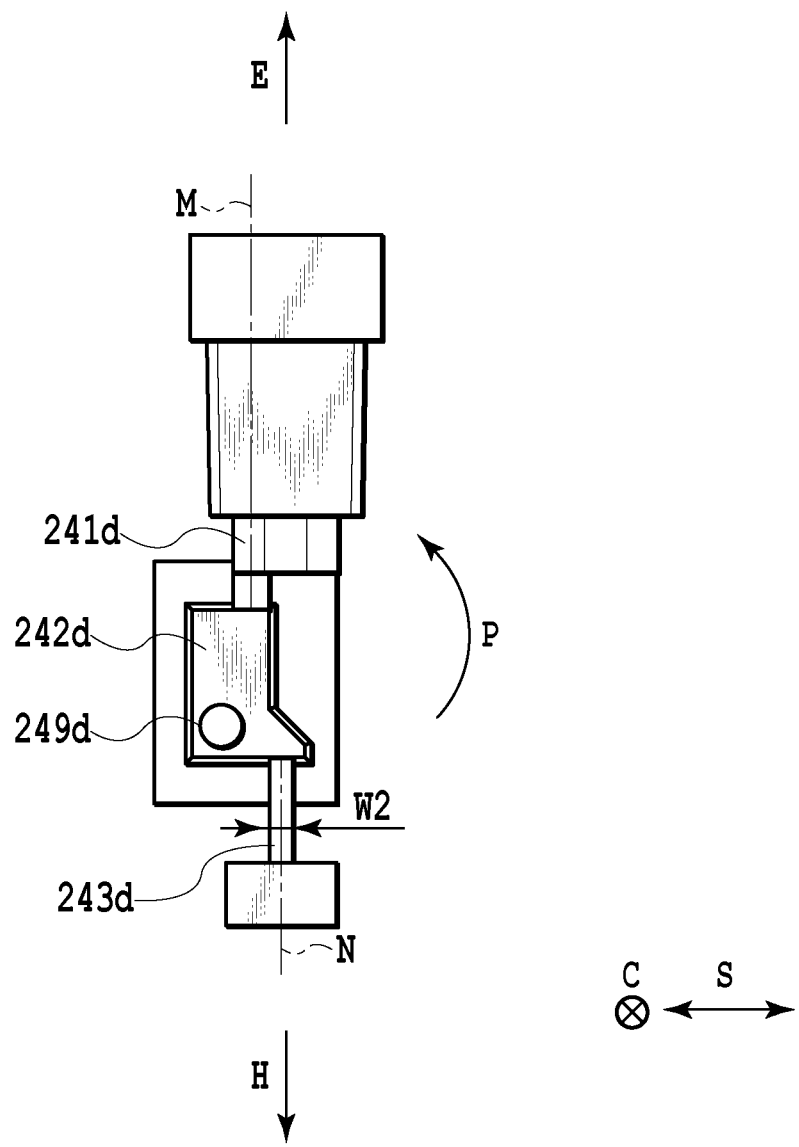
FIG. 19 is a front plan view illustrating the arrangement of the pieces according to the second embodiment of the present invention.

Next, an explanation will be made of a second liquid chamber 222d. FIG. 18A is a perspective view illustrating arrangement of only pieces of the mold for forming the first liquid chamber 221d, the second liquid chamber 222d and the third liquid chamber 223d at the molding. FIG. 18B is a perspective view illustrating a state where the pieces in FIG. 18A are respectively extracted. FIG. 19 is a front view illustrating arrangement of only pieces of the mold for forming the first liquid chamber 221d, the second liquid chamber 222d and the third liquid chamber 223d at the molding with the fourth piece 244d removed in FIG. 18A, as viewed in a direction of an arrow F in FIG. 18A.

As illustrated in FIG. 19, a center axis M of an abutting part and a center axis N of an abutting part of each of the first piece 241d and the third piece 243d on the second piece 242d are positioned not to be on the same straight line. For example, if the processing accuracy of the piece varies and the abutting state between each piece and the second piece 242d becomes excessive, since the center axis M and the center axis N when the pieces abut on each other are not positioned on the same straight line, there is a possibility that the second piece 242d is twisted in a direction of an arrow P in FIG. 19 to make the abutting state unstable. However, since a tip end 249d of the second piece 242d as the fitting part is positioned not between the center axis M and the center axis N, but outside thereof, it is possible to prevent the twist of the second piece 242d in the direction of the arrow P.

The adoption of the mold and the manufacturing method as described above suppress the abutting state of the pieces each other from becoming unstable at the molding of the liquid ejecting head as the molded member, thus making it possible to suppress the generation of the burr.

Third Embodiment

Figure 20:
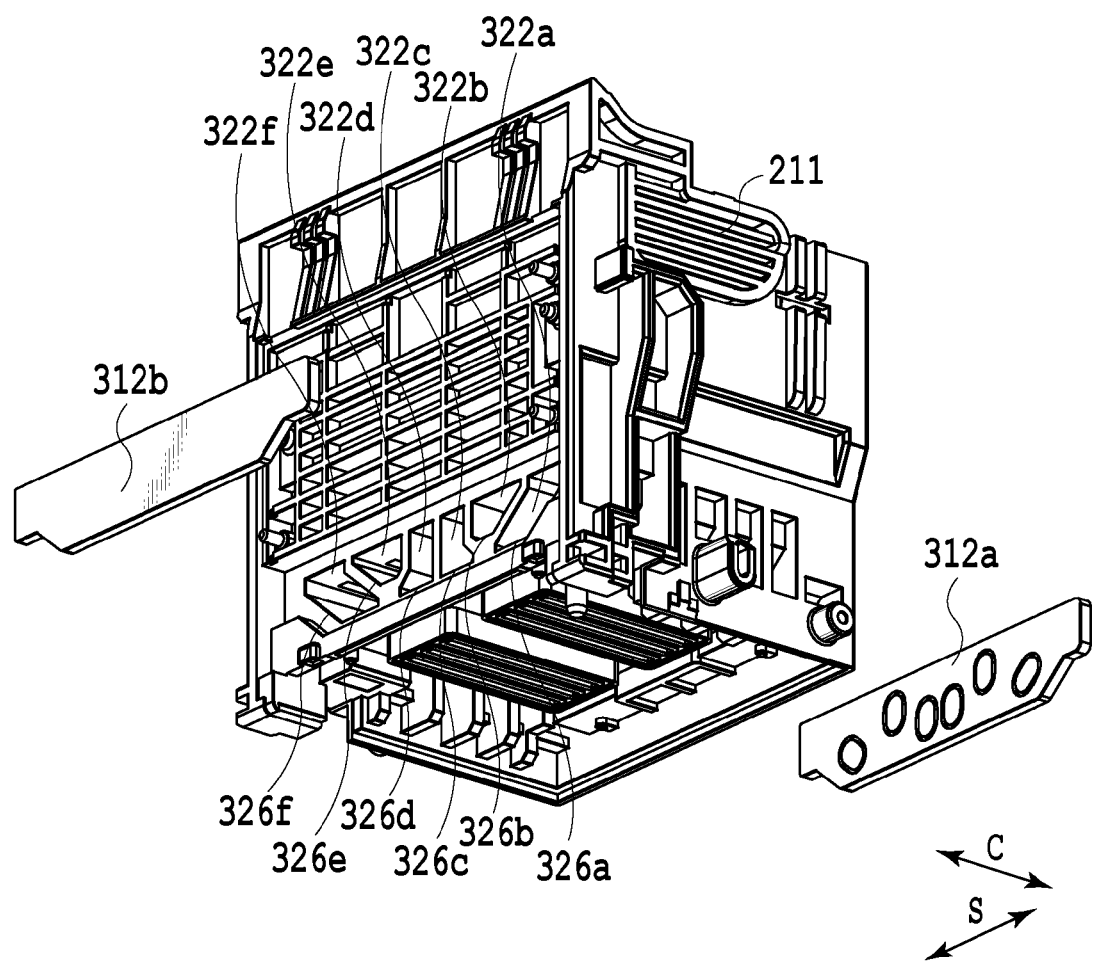
FIG. 20 is an exploded perspective view illustrating a liquid ejecting head according to a third embodiment of the present invention.

In a third embodiment, an explanation will be made only of components and manufacturing methods different from those in the first and second embodiments, and an explanation of the other similar components and manufacturing methods is omitted. FIG. 20 is an exploded perspective view illustrating a housing 311 and lid members 312a, 312b in a liquid ejecting head (not illustrated) of the third embodiment. Second liquid chambers 322a to 322f are formed by the housing 311, a lid member 312a for closing opening parts 325a to 325f each having an oval shape, and a lid member 312b for closing opening parts 326a to 326f.

Figure 21A:
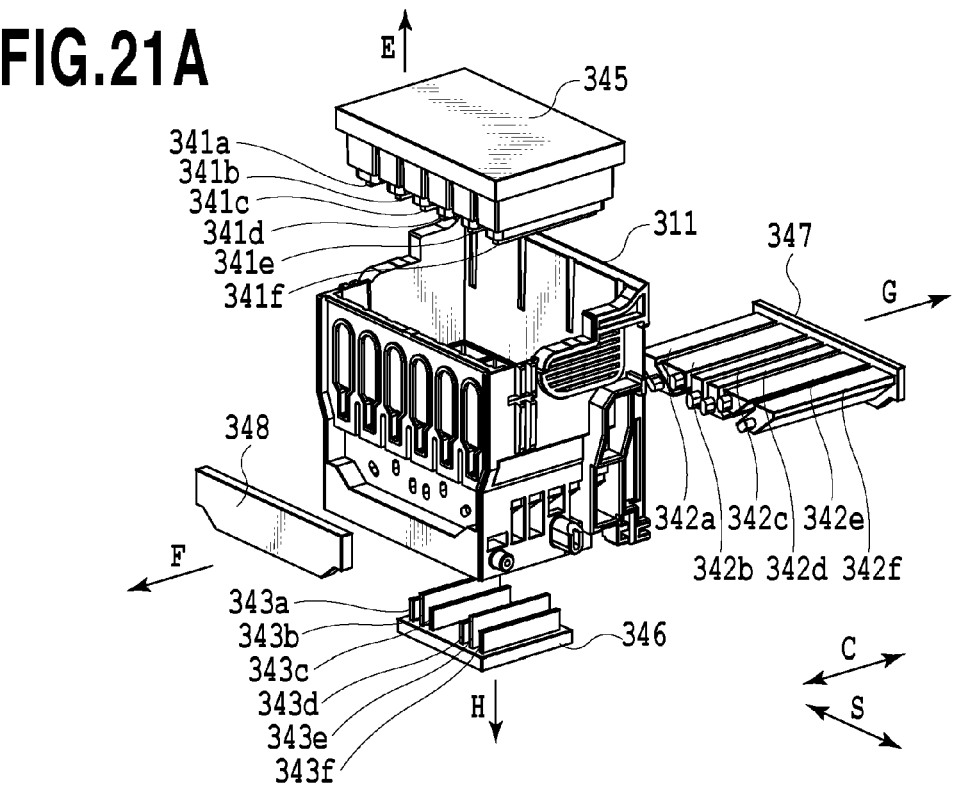
FIG. 21A and FIG. 21B are perspective views each illustrating arrangement of pieces according to the third embodiment of the present invention.
Figure 21B:
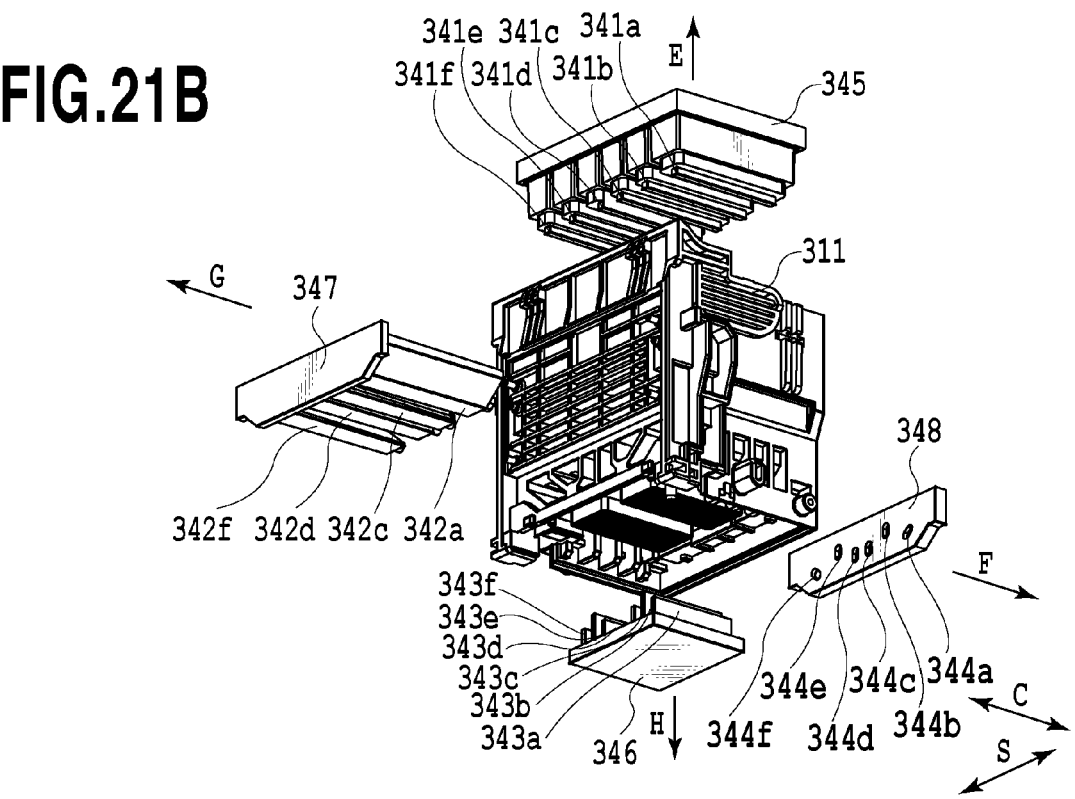

FIG. 21A and FIG. 21B are perspective views each illustrating a state of the housing 311 and pieces of the mold with the pieces of the mold being extracted in the manufacturing process of the housing 311 as a molded member. Since methods for manufacturing six first liquid chambers to six third liquid chambers each are the same method, an explanation will be made of the details of the liquid chambers using a first liquid chamber 321f, the second liquid chamber 322f and a third liquid chamber 323f.

Figure 22A:
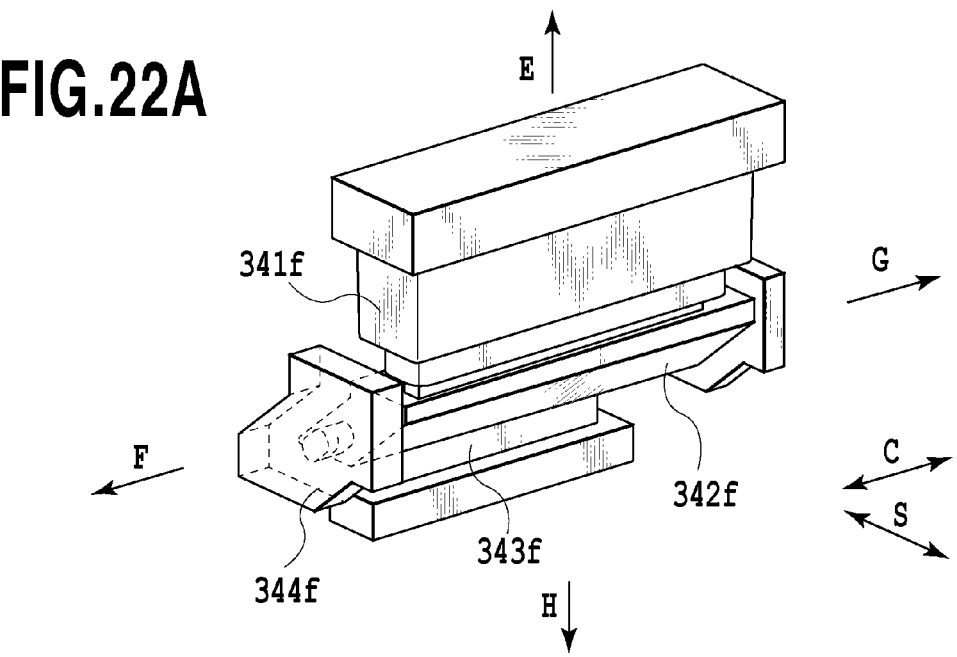
FIG. 22A and FIG. 22B are detailed perspective views each illustrating the arrangement of the pieces according to the third embodiment of the present invention.
Figure 22B:
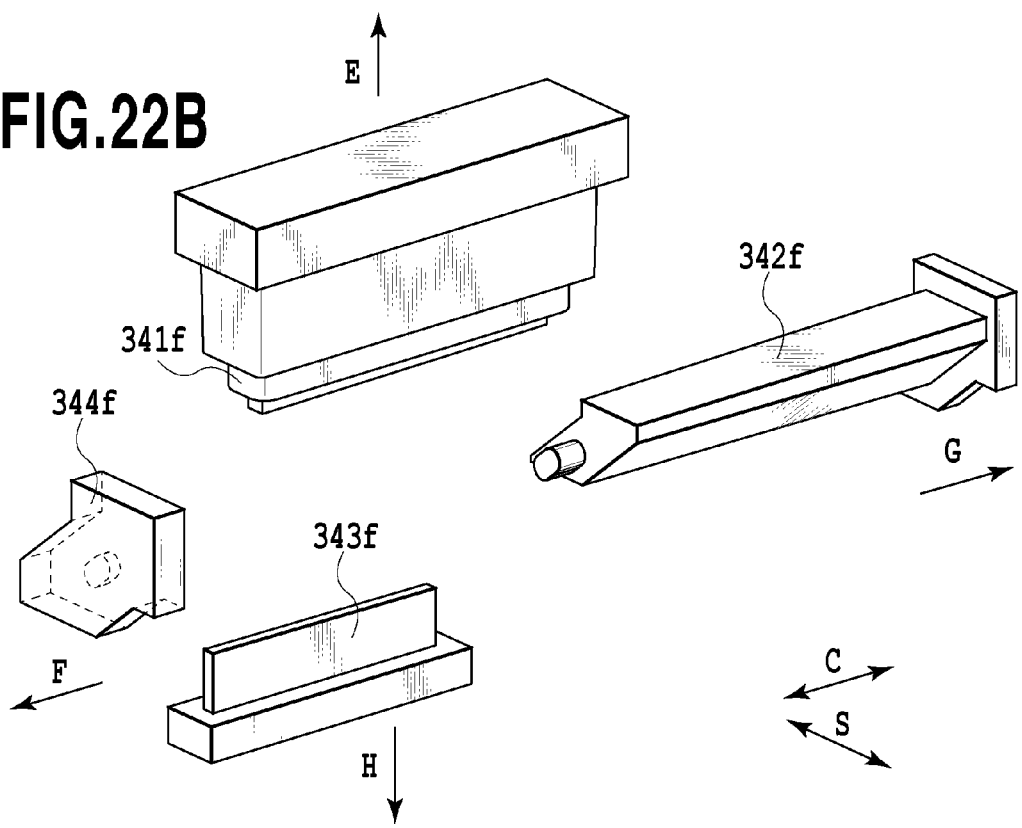
Figure 23:
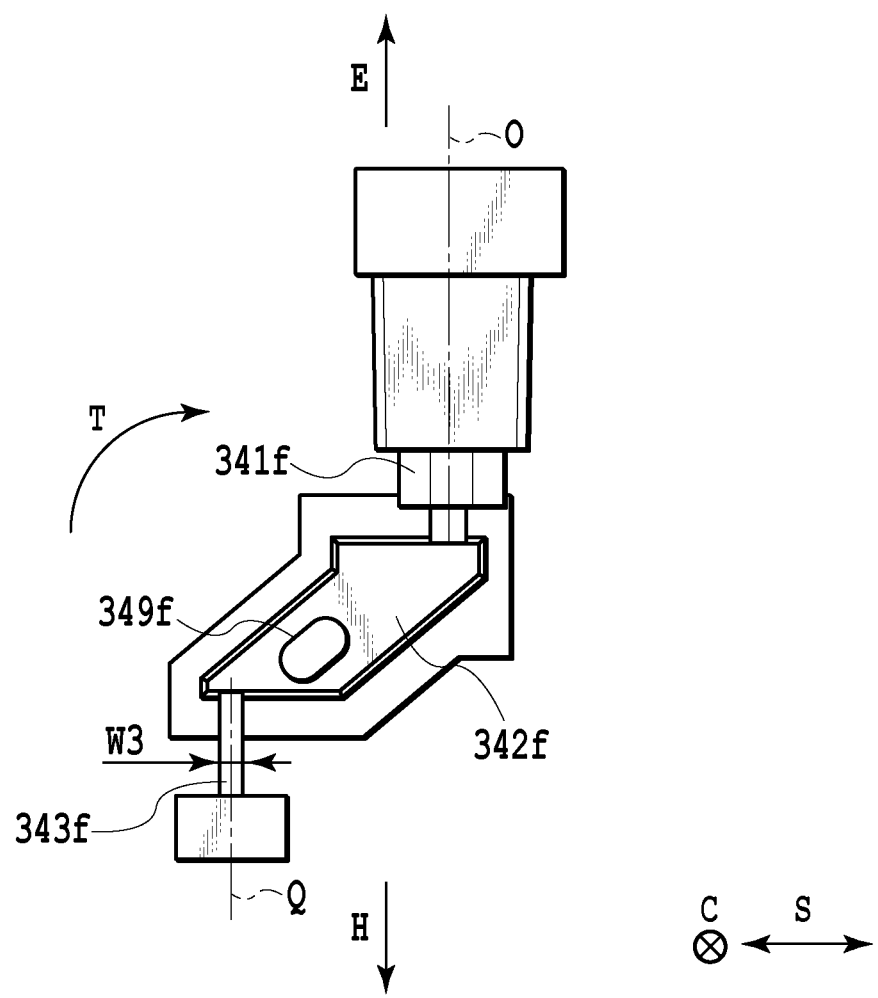
FIG. 23 is a front view illustrating the arrangement of the pieces according to the third embodiment of the present invention.

FIG. 22A is a perspective view illustrating arrangement of only pieces of the mold of forming the first liquid chamber 321f, the second liquid chamber 322f and the third liquid chamber 323f at the molding. FIG. 22B is a perspective view illustrating a state where the pieces in FIG. 22A are respectively extracted. FIG. 23 is a front view illustrating arrangement of only the pieces of the mold of forming the first liquid chamber 321f, the second liquid chamber 322f and the third liquid chamber 323f at the molding with the fourth piece 344f removed in FIG. 22A, as viewed from an arrow F in FIG. 22A.

The first liquid chamber 321f is formed by the first piece 341f, which is extracted in a direction E indicated in FIG. 21A to FIG. 23. The third liquid chamber 323f is formed by the third piece 343f, which is extracted in a direction H indicated in FIG. 21A to FIG. 23. The second liquid chamber 322f is formed by the second piece 342f and the fourth piece 344f, which are respectively extracted in a direction G and in a direction F indicated in FIG. 21A to FIG. 22B. That is, the first piece, the second piece, the third piece and the fourth piece are extracted in the four directions. The first piece and the third piece are extracted in substantially opposing directions. The second piece and the fourth piece are extracted in substantially opposing directions. The extraction direction of the first piece and the third piece may be substantially vertical to the extraction direction of the second piece and the fourth piece.

The second piece is formed in a shape long in the crossing direction C, and an aspect ratio between a width in the scan direction S and a length in the crossing direction C may be, for example, 1 to 4 or more.

As illustrated in FIG. 23, at the molding, a tip end of each of the first piece 341f and the third piece 343f abuts on the second piece 342f. As illustrated in FIG. 21B, the fourth piece 344f is formed as a hole in an oval shape to be capable of being fitted in a tip end 349f of the second piece 342f that is a pin having an oval shape, and at the molding, the fourth piece 344f and the tip end 349f are fitted to each other as illustrated in FIG. 22A.

The fitting parts of the pieces each other require a high degree of dimension accuracy because of repeatability. In the present embodiment, since a simple oval pin and hole are adopted in the fitting part, the processing accuracy of the piece can be easily put out, and the processing of the piece is easy. It should be noted that a relation between the pin and the hole may be in reverse thereto.

Since the second piece 342f is long in the crossing direction C and a width W3 of the third piece 343f in the scan direction S is narrow as illustrated in FIG. 23, abutting parts between the second piece 342f and the third piece 343f have such a shape as to be inclined to be unstable. However, since at the molding, the second piece 342f is fitted in the fourth piece 344f to be securely fixed to, the abutting state can be stably secured. Further, in the abutting parts of the second piece 342f and the third piece 343f on the second piece 342f, the fitting part is arranged in a position closer to the abutting part of the third piece 343f having a narrow width of the piece and a small abutting area on the second piece 342f. Therefore it is possible to stably secure the abutting state more certainly.

It should be noted that, as illustrated in FIG. 21A and FIG. 21B, in the present embodiment, combinations of a plurality of second pieces and a plurality of third pieces forming a plurality of second liquid chambers are respectively provided with fitting parts, but the present invention is not limited thereto. For example, in a plurality of second liquid chambers lining up in a line, the fitting part may be provided in at least a combination of a second piece and a third piece for the second liquid chamber at the outermost side.

As illustrated in FIG. 23, a center axis O of an abutting part and a center axis Q of an abutting part of each of the first piece 341f and the third piece 343f on the second piece 342f are positioned not to be on the same straight line. For example, if the processing accuracy of the piece varies and the abutting state of each piece on the second piece 342f becomes excessive, since the center axis O and the center axis Q when the pieces abut on each other are not positioned on the same straight line, there is a possibility that the second piece 342f is twisted in a direction of an arrow T in FIG. 23 to make the abutting state unstable. However, since the second piece 342f and the fourth piece 344f are fitted in an oval shape, it is possible to prevent the twist of the second piece 342f.

The adoption of the mold and the manufacturing method as described above suppress the abutting state of the pieces each other from becoming unstable at the molding of the liquid ejecting head as the molded member, thus making it possible to suppress the generation of the burr.

As described above, the present invention is explained by taking the liquid ejecting head as an example, but the present invention is not limited thereto, and it is understood that the present invention may be applied to a molded member having a hollow part inside thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-105160, filed May 25, 2015 and No. 2016-085625, filed Apr. 21, 2016 which are hereby incorporated by reference wherein in their entirety.

What is claimed is:

1. A method for manufacturing a liquid ejecting head including a print element having an ejecting unit configured to eject a liquid and a liquid chamber for supplying the liquid to the print element, wherein a housing provided with the liquid chamber is formed by a molded member, the method comprising:
a step for molding the liquid chamber by extracting a first piece, a second piece, a third piece, and a fourth piece of a mold in four different directions,
wherein the second piece has an elongated shape in its extracting direction,
wherein the second piece and the fourth piece have extracting directions substantially opposed to each other,
wherein, at the molding, each of the first piece, the second piece, the third piece, and the fourth piece abuts on at least one of the first piece, the second piece, the third piece, and the fourth piece,
wherein the first piece and the third piece have extracting directions substantially opposed to each other, and, at the molding, respectively abut on the second piece,
wherein a filter is disposed in an opening part formed by extracting the first piece,
wherein an opening part formed by extracting the second piece is closed by a first lid member, and
wherein an opening part formed by extracting the fourth piece is closed by a second lid member.

2. The method according to claim 1, wherein an abutting surface between the second piece and the fourth piece is inclined to a direction of extracting the second piece.

3. The method according to claim 1,
wherein the liquid ejecting head comprises a plurality of liquid chambers,
wherein the plurality of liquid chambers are arrayed in parallel in a direction substantially perpendicular to the extracting directions of the second piece and the fourth piece of the mold, and
wherein the second piece and the fourth piece for molding at least a liquid chamber positioned in an outermost side of the plurality of liquid chambers include fitting parts fitted to each other.

4. The method according to claim 1,
wherein the liquid chamber is formed by:
a first step for forming the housing, the first lid member, and the second lid member respectively by injection molding,
a second step for performing abutting between the housing and the first lid member, and abutting between the housing and the second lid member, and
a third step for filling sealing materials in between abutting parts of the housing and the first lid member, and in between abutting parts of the housing and the second lid member to join the abutting parts, and
wherein the first to third steps are sequentially executed in the same mold.

5. A method for manufacturing a liquid ejecting head including a print element having an ejecting unit configured to eject a liquid and a liquid chamber for supplying the liquid to the print element, wherein a housing provided with the liquid chamber is formed by a molded member, the method comprising:
a step for molding the liquid chamber by extracting a first piece, a second piece, a third piece, and a fourth piece of a mold in four different directions,
wherein the second piece has an elongated shape in its extracting direction,
wherein the second piece and the fourth piece have extracting directions substantially opposed to each other,
wherein, at the molding, each of the first piece, the second piece, the third piece, and the fourth piece abuts on at least one of the first piece, the second piece, the third piece, and the fourth piece,
wherein the liquid ejecting head comprises a plurality of liquid chambers,
wherein the plurality of liquid chambers are arrayed in parallel in a direction substantially perpendicular to the extracting directions of the second piece and the fourth piece of the mold,
wherein the second piece and the fourth piece for molding at least a liquid chamber positioned in an outermost side of the plurality of liquid chambers include fitting parts fitted to each other, wherein an abutting area between the third piece and the second piece is smaller than an abutting area between the first piece and the second piece, and wherein the fitting part is disposed in a vicinity of the third piece.

6. The method according to claim 3, wherein the fitting part of the second piece includes a circular pin, and wherein the fitting part of the fourth piece includes a circular hole.

7. The method according to claim 3, wherein the fitting part of the second piece includes an oval pin, and wherein the fitting part of the fourth piece includes an oval hole.

8. The method according to claim 3, wherein the first piece and the third piece are positioned in a relation in which a first center axis of an abutting part of the first piece and a second center axis of an abutting part of the third piece on the second piece are respectively positioned not to be on the same straight line, and wherein the fitting part is arranged outside of the first and second center axes.

9. A liquid ejecting head including a print element having an ejecting unit configured to eject a liquid and a liquid chamber for supplying the liquid to the print element, wherein a housing provided with the liquid chamber is formed by a molded member, the liquid ejecting head being manufactured by a method comprising:

a step for molding the liquid chamber by extracting a first piece, a second piece, a third piece and a fourth piece of a mold in four different directions, wherein the second piece has an elongated shape in its extracting direction, wherein the second piece and the fourth piece have extracting directions substantially opposed to each other, and wherein, at the molding, each of the first piece, the second piece, the third piece, and the fourth piece abuts on at least one of the first piece, the second piece, the third piece, and the fourth piece, wherein the first piece and the third piece have extracting directions substantially opposed to each other, and at the molding, respectively abut on the second piece, wherein a filter is disposed in an opening part formed by extracting the first piece, wherein an opening part formed by extracting the second piece is closed by a first lid member, and wherein an opening part formed by extracting the fourth piece is closed by a second lid member.

10. A mold comprising:

a first piece;

a second piece;

a third piece; and a fourth piece;

wherein the second piece has an elongated shape in its extracting direction, wherein the second piece and the fourth piece have extracting directions substantially opposed to each other, wherein the first piece and the third piece have extracting directions substantially opposed to each other, and wherein the mold is configured to be suitable for a method for manufacturing a molded member having a hollow part by extracting the first piece, the second piece, the third piece, and the fourth piece of the mold in four different directions, such that:

at the molding, each of the first piece, the second piece, the third piece, and the fourth piece abuts on at least one of the first piece, the second piece, the third piece, and the fourth piece, at the molding, the first piece and the third piece respectively abut on the second piece, a filter is disposed in an opening part formed by extracting the first piece, an opening part formed by extracting the second piece is closed by a first lid member, and an opening part formed by extracting the fourth piece is closed by a second lid member.

* * * * *